(12) United States Patent
Itoh

(10) Patent No.: US 8,496,335 B2
(45) Date of Patent: Jul. 30, 2013

(54) ILLUMINATION APPARATUS, PROJECTOR, AND ILLUMINATION METHOD

(75) Inventor: Yoshitaka Itoh, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 255 days.

(21) Appl. No.: 12/423,296

(22) Filed: Apr. 14, 2009

(65) Prior Publication Data

US 2009/0273760 A1 Nov. 5, 2009

(30) Foreign Application Priority Data

May 2, 2008 (JP) .................................. 2008-120305
Jan. 28, 2009 (JP) .................................. 2009-016759

(51) Int. Cl.
G03B 21/26 (2006.01)
G03B 21/28 (2006.01)
G02B 27/14 (2006.01)
F21V 1/00 (2006.01)
F21V 11/00 (2006.01)

(52) U.S. Cl.
USPC ................. 353/94; 353/81; 353/98; 359/638; 362/236

(58) Field of Classification Search
USPC .................. 353/99, 98, 94, 81; 359/638, 639, 359/833, 619, 642; 362/236, 241, 244, 228–31, 362/249.01, 249.02; 385/133
See application file for complete search history.

(56) References Cited

U.S. PATENT DOCUMENTS

| | | | | |
|---|---|---|---|---|
| 5,625,738 | A * | 4/1997 | Magarill | 385/146 |
| 7,090,357 | B2 * | 8/2006 | Magarill et al. | 353/94 |
| 2002/0033933 | A1 * | 3/2002 | Yamamoto | 353/94 |
| 2004/0021835 | A1 * | 2/2004 | Yamada et al. | 353/74 |
| 2004/0145812 | A1 * | 7/2004 | Chang | 359/630 |
| 2005/0254018 | A1 * | 11/2005 | Magarill et al. | 353/94 |
| 2007/0160340 | A1 * | 7/2007 | Wu | 385/146 |

FOREIGN PATENT DOCUMENTS

| | | |
|---|---|---|
| CN | 200941144 Y | 8/2007 |
| JP | A-6-265887 | 9/1994 |
| JP | A-2000-3612 | 1/2000 |
| JP | A-2003-330109 | 11/2003 |
| JP | A-2006-208471 | 8/2006 |

* cited by examiner

Primary Examiner — William C Dowling
Assistant Examiner — Ryan Howard
(74) Attorney, Agent, or Firm — Oliff & Berridge, PLC

(57) ABSTRACT

A projector includes an illumination optical system, a light modulation element, and a projection optical system. The illumination optical system includes a first light source section, a plurality of second light source sections, and an optical axis conversion element. The optical axis conversion element emits the light beam, which is input from the first light source section, so that an exit optical axis of the light beam approximately matches with an illumination optical axis, and emits the light beams, which are respectively input from the plurality of second light source sections, so that exit optical axes of the light beams intersect the exit optical axis of the light beam from the first light source section between the optical axis conversion element and the light modulation element.

20 Claims, 26 Drawing Sheets

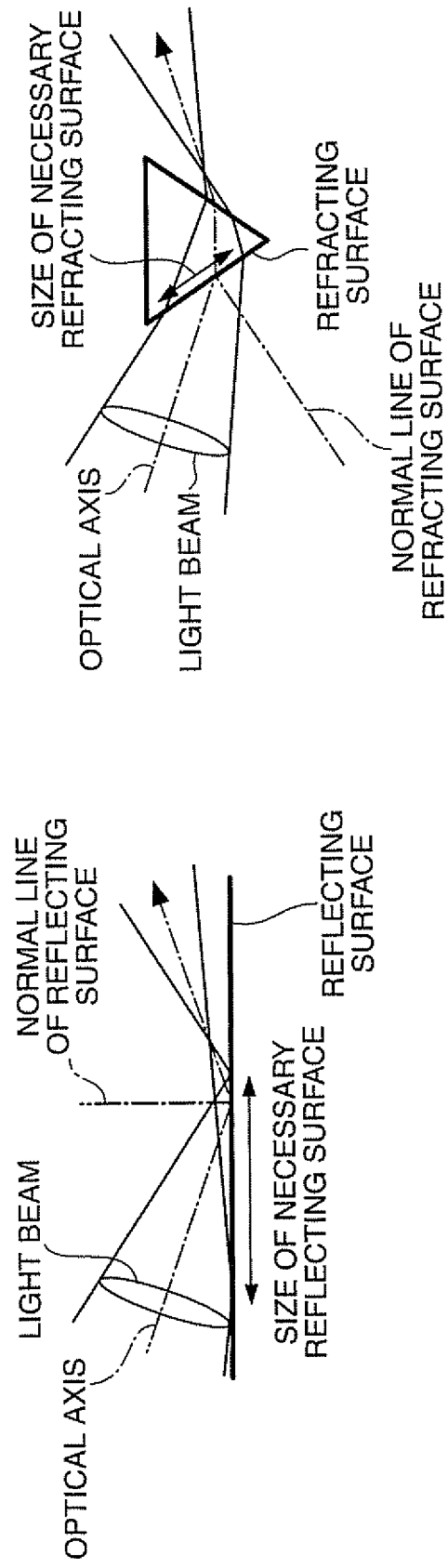

ILLUMINATION APPARATUS, PROJECTOR, AND ILLUMINATION METHOD

BACKGROUND

1. Technical Field

The present invention relates to an illumination apparatus for illuminating, for example, a light modulation element, a projector for projecting and displaying an optical image, which is provided to, for example, a light modulation element, on a screen with a projection lens, and an illumination method, and more specifically to a configuration of an illumination optical system of an illumination apparatus and a projector provided with a plurality of light source sections.

2. Related Art

A projector illuminating a small-sized light modulation element, which forms an optical image in accordance with image information, with light from an illumination apparatus, and projecting the optical image on a screen or the like with a projection lens has been put into practical use as one of apparatuses capable of displaying a large-screen image. For such a projector, there have been strongly desired growth in size of the screen and improvement in the luminance of the projection image, and reduction of the luminance variation and the color variation, and high-performance illumination optical systems capable of realizing these desires have been under development.

For example, in the projection display apparatus (projector) disclosed in JP-A-6-265887 (Document 1, see in particular FIG. 1), improvement in the intensity of the light for illuminating a light valve (a light modulation element) is achieved using two light source sections. Further, this projection display apparatus is provided with integrator optical systems corresponding respectively to the light source sections, thereby achieving reduction of the luminance variation and the color variation of the illumination light. Optical elements such as light modulation elements and polarization elements represented by liquid crystal light valves, or projection lenses each have an optical characteristic having an angular dependency on incident light. Therefore, in order for achieving improvement in the image quality of the display image, it is desirable to use a light source section capable of emitting illumination light with a narrow spread of the angular distribution.

However, according to the configuration of this projector, since the two light source sections are disposed at locations substantially distant from the illumination optical axis, the angular distribution of the illumination light spreads widely, and two groups of light source images formed on the pupil plane of the projection lens are formed at locations distant from the projection optical axis. As a result, degradation of the contrast of the display image is caused, and it is not successful to improve the luminance of the display image so much as expected. Further, since the imaging performance of the projection lens is high in the vicinity of the projection optical axis and drops in accordance the distance from the projection optical axis, the imaging performance of the projection lens cannot sufficiently be exerted, and deterioration of the image quality of the display image is caused. Further, in the case in which the emission characteristics of the two light source sections are different from each other, the luminance variation and the color variation due to the difference in the form of vignetting of the projection light caused by the vignetting of the projection lens occur in the display image.

JP-A-2000-3612 (Document 2, see in particular FIG. 1) discloses a projection display apparatus (a projector) achieving elimination of the problems described above. The illumination optical system used here has a configuration provided with two light source sections each formed of an ellipsoidal reflector having the first focal point in the vicinity of the light emitter, and reflecting prisms (reflecting surfaces) disposed at the second focal points of the respective ellipsoidal reflectors, and thereby reflecting light beams from the respective light source sections towards the integrator with the reflecting prisms. Thus, the position of the secondary light source image of the light emitter formed on the reflecting surface of the reflecting prism comes closer to the illumination optical axis than the position of the original light emitter. Since in the subsequent part of the optical system the position of the secondary light source image can be assumed as the light source position and thus treated, an arrangement equivalent to the arrangement in which the two light source sections are disposed substantially closely to the illumination optical axis is achieved, and it becomes possible to improve the problems described above.

However, in the illumination apparatus described in the Document 2, the light source images formed on the pupil plane of the projection lens are still formed at positions distant from the projection optical axis. The reason therefor is as follows. That is, forming the secondary light source images of the respective light source sections at positions close to the illumination optical axis as much as possible is exactly the same as forming the respective secondary light source images at positions close to an apex of the reflecting prism. However, since the secondary light source image has a certain finite size, the reflecting surface is required to have an appropriate area, and it is not achievable to reflect the light beam in the nearest neighbor area of the apex of the reflecting prism. Therefore, most part of the light source image is still located in other areas than on the projection optical axis where the projection lens exerts the highest imaging performance, and the improvement effect of the problems can be expected, but is not necessarily sufficient in comparison with the case with the projector disclosed in the Document 1 described above.

SUMMARY

In view of the circumstances described above, the invention has an advantage of achieving reduction of the luminance variation and the color variation of a projection image in the projector equipped with an illumination apparatus or an illumination optical system having a plurality of light source sections, and further, of realizing an illumination apparatus and a projector capable of sufficiently exerting the imaging performance of the projection lens.

A projector according to an aspect of the invention includes an illumination optical system, a light modulation element adapted to modulate a light beam from the illumination optical system, and a projection optical system adapted to project the light beam modulated by the light modulation element, and the illumination optical system includes a first light source section, a plurality of second light source sections, and an optical axis conversion element adapted to emit light beams, which are input from the first light source section and the plurality of second light source sections, in predetermined directions, respectively, and the optical axis conversion element emits the light beam, which is input from the first light source section, so that an exit optical axis of the light beam approximately matches with an illumination optical axis, and emits the light beams, which are respectively input from the plurality of second light source sections, so that exit optical axes of the light beams intersect the exit optical axis of the light beam from the first light source section between the optical axis conversion element and the light modulation element.

It should be noted that the "illumination optical axis" used in the present specification denotes a normal line of an illumination surface of the illumination object, which is illuminated by the illumination optical system, the normal line passing through the center of the illumination surface. The "exit optical axis" denotes the optical axis of the light beam emitted from one of the optical axis conversion element, and the first and second light source sections. Further, the "exit optical axis of the optical axis conversion element" exists in each of the light beams emitted from the respective light source sections.

In the projector according to this aspect of the invention, the optical axis conversion element has a function of emitting the light beam from the first light source section so that the exit optical axis of the light beam approximately matches with the illumination optical axis, and emitting the light beams from the plurality of second light source sections so that the exit optical axes of the light beams intersect the exit optical axis of the light beam from the first light source section between the optical axis conversion element and the light modulation element. By thus using the optical axis conversion element described above when combining the light beams from the plurality of light source sections, it is possible to make the light source images of the light beams from the plurality of light source sections come close to each other, and further to dispose the optical axis of the light beam from at least one of the light source sections on the illumination optical axis. Since the combined light beam to be an illumination light beam in the condition of superimposing the light beams from the respective light source sections with each other can be formed, and the light beam with the maximum intensity can be disposed at an approximate center of the combined light beam, the angular distribution of the illumination light beam can be prevented from spreading, and high light use efficiency can be realized. Further, since a plurality of light source images formed on the pupil plane of the projection optical system is concentrated into the area centered approximately on the projection optical axis, and is formed in symmetrical conditions, it is suitable for exerting the imaging performance inherent to the projection lens, and thus the display image with only a little illumination variation and color variation, and superior in evenness can be realized. Further, even in the case in which one or two of the light source sections become unable to light, a significant illumination variation can be prevented from occurring, and improvement in usability can be realized.

In the projector according to this aspect of the invention, it is desirable that the optical axis conversion element emits the light beams, which are input from the plurality of second light source sections, so that the exit optical axes of all of the light beams from the plurality of second light source sections intersect the exit optical axis of the light beam from the first light source section at a point between the optical axis conversion element and the light modulation element.

Although it is not necessarily required that the exit optical axes of all of the light beams from the plurality of second light source sections intersect with each other at a point, since the diameter of the combined light beam can be reduced as much as possible by adopting the configuration in which the exit optical axes of all of the light beams from the plurality of second light source sections intersect the exit optical axis of the light beam from the first light source section at a point, it is suitable for improving the illumination efficiency in the subsequent optical system, and for achieving downsizing of the subsequent optical system.

In the projector according to this aspect of the invention, it is desirable that an integrator optical system is disposed between the optical axis conversion element and the light modulation element.

According to this configuration, equalization of the luminance of the combined light beam by the optical axis conversion element can be achieved by the operation of the integrator optical system, and it becomes possible to further reduce the luminance variation and the color variation of the projection images.

In the case in which the integrator optical system is provided, it is desirable that the exit optical axes of all of the light beams from the plurality of second light source sections intersect the exit optical axis of the light beam from the first light source section at a position of or close to a light beam dividing section for dividing the incident light beam into a plurality of partial light beams in the integrator optical system.

More specifically, in the case in which the integrator optical system includes at least a lens array (the light beam dividing section) adapted to divide the light beams, which are input from the first light source section and the plurality of second light source sections, into a plurality of light beams, it is desirable that the optical axis conversion element emits the light beams, which are input from the plurality of second light source sections, so that the exit optical axes of all of the light beams from the plurality of second light source sections intersect the exit optical axis of the light beam from the first light source section at a position of or close to the lens array.

Alternatively, in the case in which the integrator optical system includes at least an integrator rod, it is desirable that the optical axis conversion element emits the light beams, which are input from the plurality of second light source sections, so that the exit optical axes of all of the light beams from the plurality of second light source sections intersect the exit optical axis of the light beam from the first light source section at a position of or close to the incident end of the integrator rod (the light beam dividing section).

According to these configurations, it is suitable for improving the illumination efficiency in the optical elements on and after the light beam dividing section, and downsizing of the integrator optical system disposed subsequently to the light beam dividing section can be achieved.

In the projector according to this aspect of the invention, it is possible to adopt a configuration in which the first light source section is disposed on an illumination optical axis, and the plurality of second light source sections is disposed at positions shifted from the illumination optical axis.

According to this configuration, the light beam, which is emitted from the first light source section, can be emitted on the illumination optical axis without being reflected or refracted, thus the configuration of the optical axis conversion element can be simplified. Further, since the plurality of second light source sections is disposed at positions shifted from the illumination optical axis, interference between each of the light source sections and the first light source section can be eliminated when arranging each of the light source sections.

In the projector according to this aspect of the invention, it is desirable that the light beam from the first light source section is focused on a position of or close to an exit end of the optical axis conversion element.

According to this configuration, downsizing of the optical axis conversion element can be achieved, and the light beam from the first light source section can efficiently be used.

In the projector according to this aspect of the invention, it is possible to adopt a configuration in which the optical axis conversion element reflects the light beams, which are emitted respectively from the plurality of second light source sections, to emit the light beams.

Although the optical axis conversion element can adopt the configuration of refracting the light beams emitted from the plurality of second light source sections and emitting them, it is possible to more significantly deflect the optical axes of the light beams emitted from the plurality of second light source sections by adopting the configuration of reflecting the light beams to emit them, and freedom of arrangement of the first light source section and the plurality of second light source sections can be enhanced.

In the projector according to this aspect of the invention, it is possible to adopt a configuration in which the optical axis conversion element has a plurality of reflecting surfaces tilted at predetermined angles with the illumination optical axis, and each of the light beams, which are emitted from the plurality of second light source sections, is reflected by either one of the plurality of reflecting surfaces.

According to this configuration, it is possible to realize the optical axis conversion element capable of exerting the function necessary for the present aspect of the invention with a simple configuration.

In the projector according to this aspect of the invention, it is desirable that on or close to each of constituent reflecting surfaces of the plurality of reflecting surfaces, the light beam from the second light source section corresponding to the reflecting surface is focused.

According to this configuration, downsizing of the optical axis conversion element can be achieved, and the light beams from the second light source sections can efficiently be used.

As the reflecting surfaces of the optical axis conversion element, it is possible to use surface-reflecting surfaces adapted to surface-reflect the light beams, which are emitted respectively from the plurality of second light source sections.

According to this configuration, there is little limitation on the incident angle when inputting the light beam to the reflecting surface, and freedom of the positional relationship between the plurality of second light source sections and the optical axis conversion element can be enhanced.

In the projector according to this aspect of the invention, it is desirable that the reflecting surface is provided with a dielectric multilayer film.

According to this configuration, it is possible to use a multilayer film obtained by alternately stacking layers made of tantalum pentoxide ($Ta_2O_5$) or niobium oxide ($Nb_2O_5$) and layers made of silicon dioxide ($SiO_2$). Such a multilayer film can realize superior heat resistance and high reflectivity, and therefore, can preferably be used in the optical axis conversion element of this aspect of the invention.

Alternatively, as the reflecting surfaces of the optical axis conversion element, it is possible to use total-reflecting surfaces adapted to totally reflect the light beams, which are emitted respectively from the plurality of second light source sections.

According to this configuration, since it is not required to form the reflecting film such as the dielectric multilayer film or metal film on the reflecting surface, and further, no light loss is caused essentially in reflection, the efficient optical axis conversion element superior in heat resistance can easily be manufactured.

In the projector according to this aspect of the invention, it is possible to adopt a configuration in which the optical axis conversion element refracts the light beams, which are emitted respectively from the plurality of second light source sections, to emit the light beams.

According to this configuration, downsizing of the optical axis conversion element can be achieved in some cases, which can contribute to downsizing of the illumination apparatus.

In the projector according to this aspect of the invention, it is possible to adopt a configuration in which a first light source section dedicated optical axis conversion element adapted to deflect an optical axis of the light beam, which is emitted from the first light source section, is provided on an entrance side of the optical axis conversion element.

According to this configuration, freedom of a position for disposing the first light source section is enhanced, and the size of the illumination apparatus in the direction along the illumination optical axis can be reduced.

In the projector according to this aspect of the invention, it is possible to adopt a configuration in which a second light source section dedicated optical axis conversion element adapted to deflect an optical axis of the light beam, which is emitted from at least one of the plurality of second light source sections, is provided on an entrance side of the optical axis conversion element.

According to this configuration, since the physical interference between the light source sections hardly occurs, and freedom of a position for disposing each of the light source sections can be enhanced, downsizing of the illumination apparatus can be achieved.

In the projector according to this aspect of the invention, it is desirable that the optical axis conversion element is provided with a radiation member.

According to this configuration, it is possible to further enhance the heat resistance of the optical axis conversion element.

In the projector according to this aspect of the invention, it is desirable that the optical axis conversion element is housed in a housing having a light transmitting property.

According to this configuration, it is possible to prevent grit and dust from attaching to the reflecting surface of the optical axis conversion element, thereby preventing deterioration of reflecting performance caused by burning of the reflecting surface caused by attachment of grit and dust.

An illumination apparatus according to another aspect of the invention includes a first light source section, a plurality of second light source sections, and an optical axis conversion element adapted to emit light beams, which are input from the first light source section and the second light source sections, in predetermined directions, respectively, and the optical axis conversion element emits the light beam, which is input from the first light source section, so that an exit optical axis of the light beam approximately matches with an illumination optical axis, and emits the light beams, which are respectively input from the plurality of second light source sections, so that exit optical axes of the light beams intersect the exit optical axis of the light beam from the first light source section on an exit side and outside of the optical axis conversion element.

Similarly to the case of the projector according to the aspect of the invention, according to the illumination apparatus of this aspect of the invention, by using the optical axis conversion element when combining the light beams from the plurality of light source sections, it is possible to make the light source images of the light beams from the plurality of light source sections come close to each other. Since the combined light beam to be an illumination light beam in the condition of superimposing the light beams from the respective light source sections with each other can be formed, and the light beam with the maximum intensity can be disposed at an approximate center of the combined light beam, the angular distribution of the illumination light beam can be prevented from spreading, and high light use efficiency can be realized.

In the illumination apparatus according to this aspect of the invention, it is desirable that the optical axis conversion element emits the light beams, which are input from the plurality of second light source sections, so that the exit optical axes of all of the light beams from the plurality of second light source sections intersect the exit optical axis of the light beam from the first light source section at a point on an exit side and outside of the optical axis conversion element.

By adopting this configuration, since the diameter of the combined light beam can be reduced as much as possible, it is suitable for improving the illumination efficiency in the subsequent optical system, and it is suitable for achieving downsizing of the subsequent optical system.

It should be noted that as the form of the optical axis conversion element, a tube-like optical member having a taper shape with a hole penetrating in a direction parallel to the illumination optical axis can be used.

According to this configuration, since weight saving and cost reduction of the optical axis conversion element can be achieved, and no physical interfacial surface exists on the transmission path of the light beam in the optical axis conversion element, the light loss caused in the light beam from the first light source section by the interfacial reflection can be reduced. Further, it is suitable for radiating the heat generated on the reflecting surface, and it is also suitable for improving the heat resistance.

Alternatively, as another form of the optical axis conversion element, a solid-core optical member with a prism shape can be used.

According to this configuration, it is suitable for improving the accuracy of forming the reflecting surfaces. Further, since the light path length can be shortened in the case of disposing the first light source section on the illumination optical axis, it is suitable for downsizing the illumination apparatus.

Alternatively, as still another form of the optical axis conversion element, an optical member having a hollowed internal space can be used.

According to this configuration, total reflection is used, thereby making it possible to improve the reflectivity. Further, since the reflecting film such as the dielectric multilayer film can be eliminated, heat damage and heat deterioration of the optical axis conversion element can be prevented.

An illumination method according to another aspect of the invention includes emitting a light beam, which is emitted from a first light source section, towards an illumination object by using an optical axis conversion element so that an exit optical axis of the light beam approximately matches with an illumination optical axis, and emitting light beams, which are emitted from a plurality of second light source sections, towards the illumination object so that exit optical axes of the light beams intersect the exit optical axis of the light beam from the first light source section on an exit side and outside of the optical axis conversion element.

According to this configuration, since the combined light beam to be an illumination light beam in the condition of superimposing the light beams from the respective light source sections with each other can be formed, and the light beam with the maximum intensity can be disposed at an approximate center of the combined light beam, the angular distribution of the illumination light beam can be prevented from spreading, and high light use efficiency can be realized.

BRIEF DESCRIPTION OF THE DRAWINGS

The invention will now be described with reference to the accompanying drawings, wherein like numbers reference like elements.

FIGS. 32A and 32B are diagrams for explaining the difference in effect between the reflective action and the refractive action.

DESCRIPTION OF EXEMPLARY EMBODIMENTS

First Embodiment

Hereinafter, a first embodiment of the invention will be explained with reference to FIGS. 1 through 9.

Figure 1:
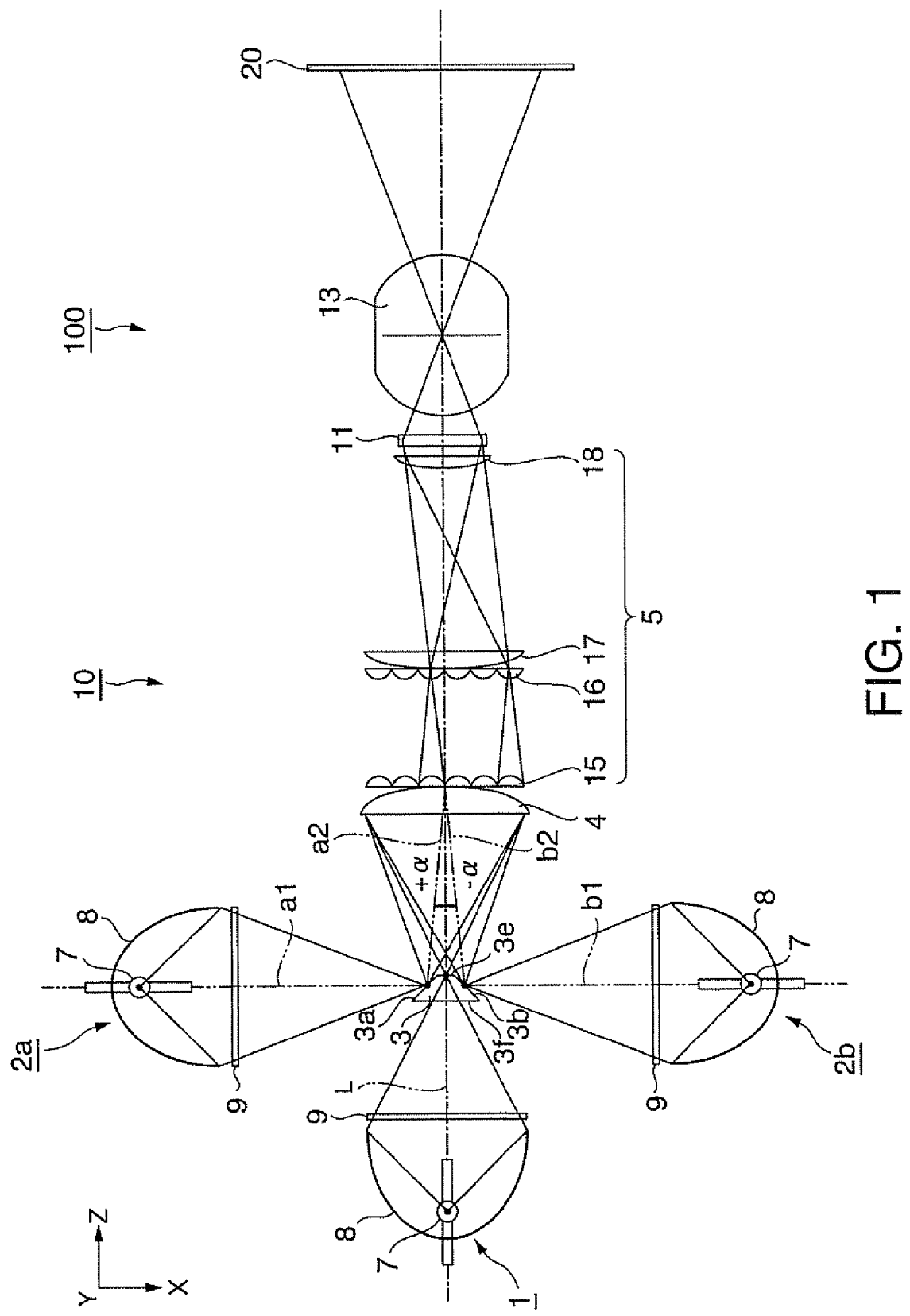
FIG. 1 is a diagram showing a configuration example of a projector equipped with an illumination apparatus according to a first embodiment of the invention.
Figure 5:
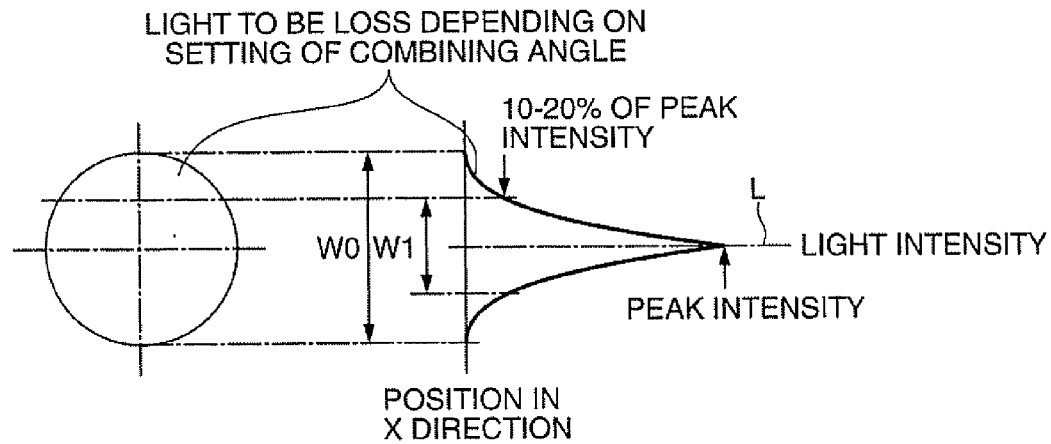
FIG. 5 is a diagram showing a light intensity distribution of a converged spot of illumination light.
Figure 6:
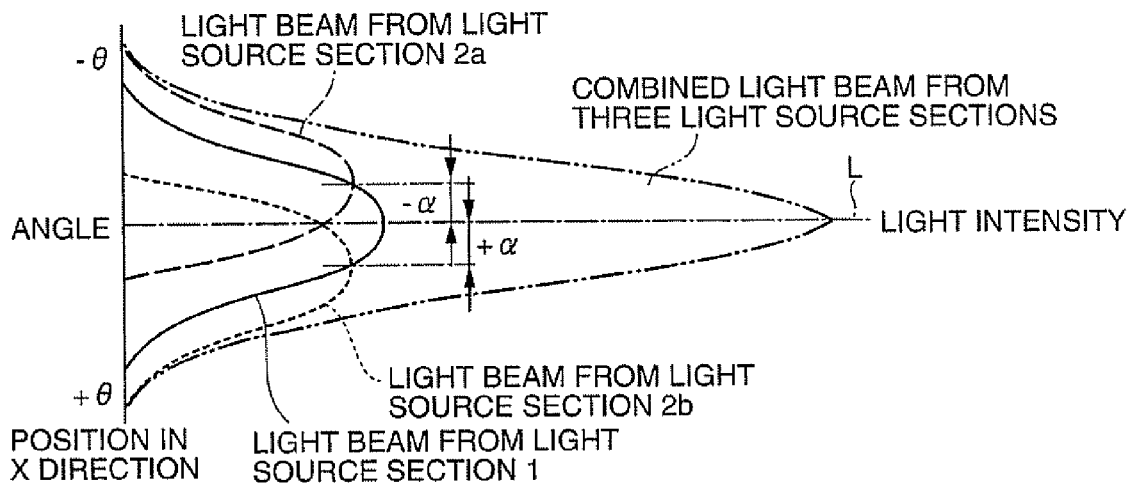
FIG. 6 is a diagram showing angular distributions of light beams input from respective light source sections to a combining lens.
Figure 7:
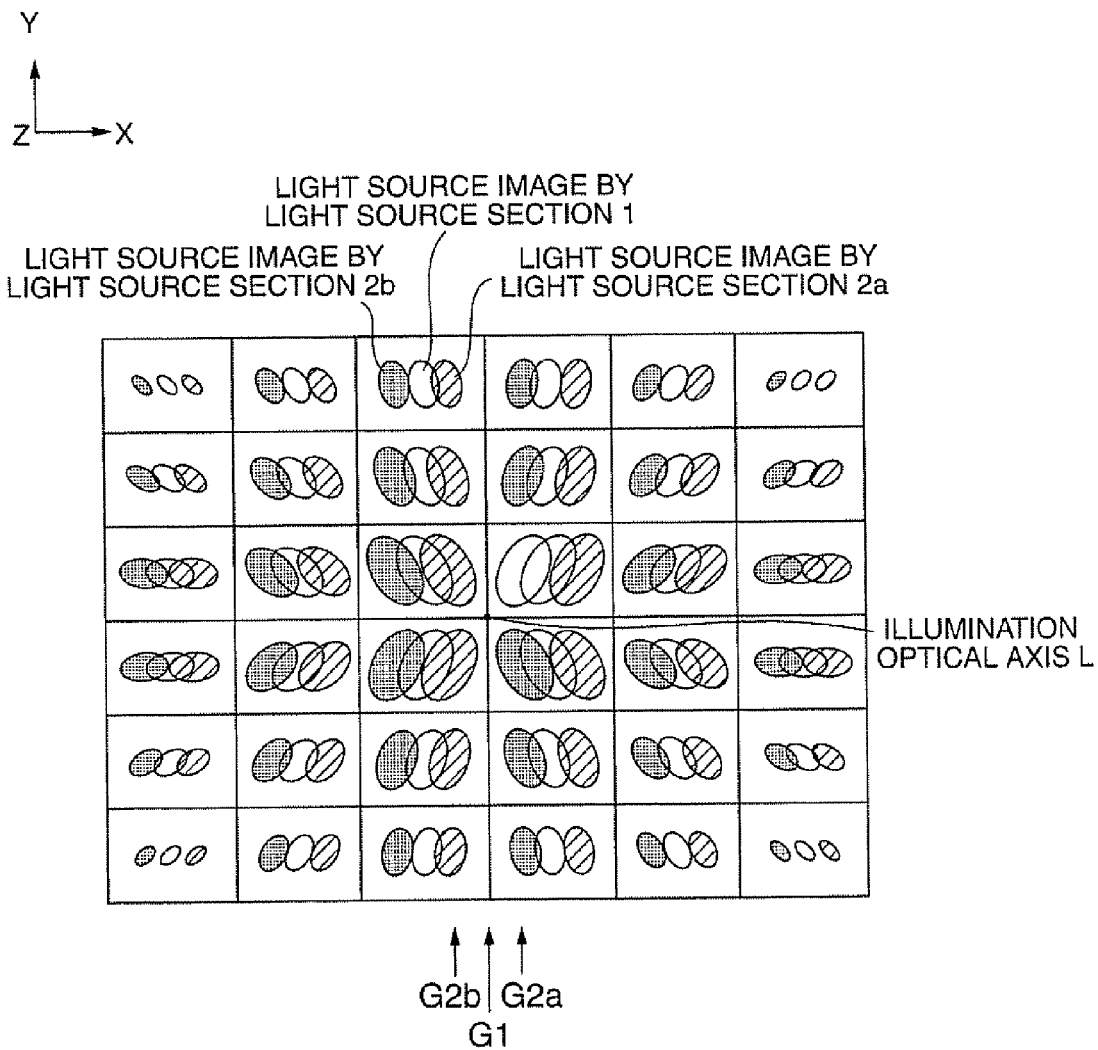
FIG. 7 is a diagram showing conditions of light source image formation in a second lens array.
Figure 8:
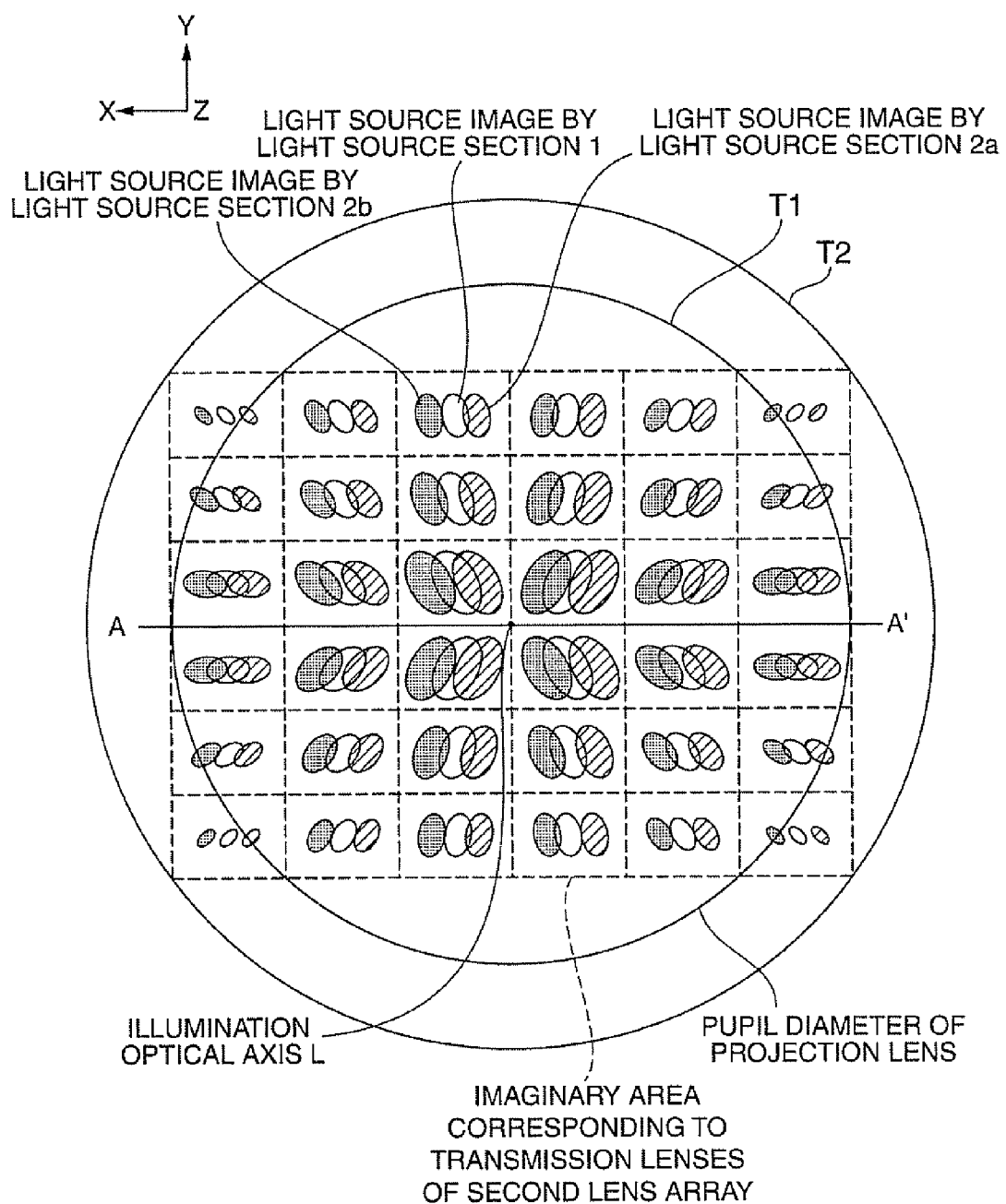
FIG. 8 is a diagram showing conditions of light source image formation on the pupil plane of a projection lens.
Figure 9:
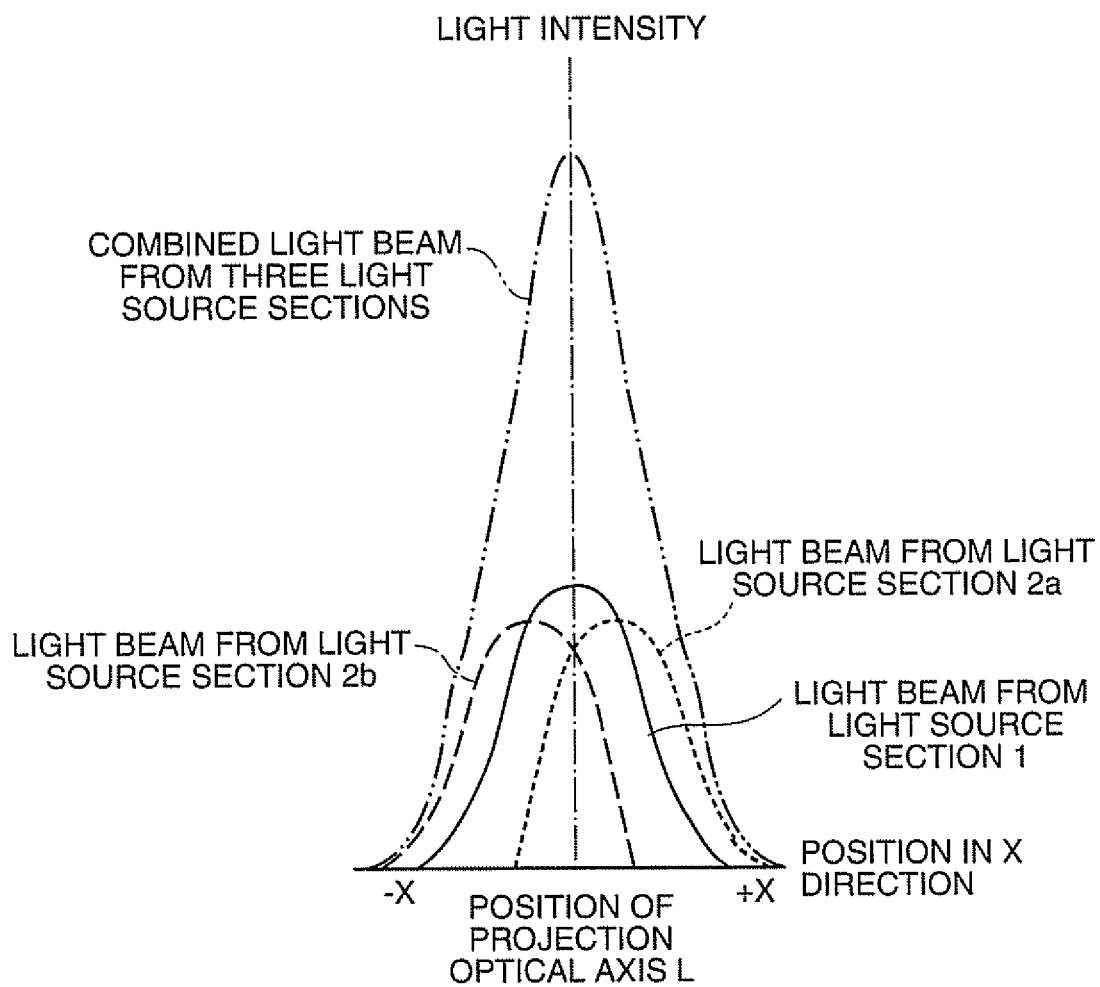
FIG. 9 is a diagram showing virtual light intensity distributions on the A-A' line shown in FIG. 8.

FIG. 1 is a diagram showing a configuration example of a projector according to the embodiment of the invention. FIGS. 2, 3A, 3B, 4A through 4C are diagrams showing several configuration examples of a reflector used in an illumination optical system of the projector of the present embodiment. FIG. 5 is a diagram showing a light intensity distribution of a converged spot of illumination light. FIG. 6 is a diagram showing angular distributions of light beams input from respective light source sections to a combining lens. FIG. 7 is a diagram showing conditions of light source image formation with respect to the respective light source sections in a second lens array of an integrator section. FIG. 8 is a diagram showing conditions of light source image formation on the pupil plane of a projection lens. FIG. 9 is a diagram showing virtual light intensity distributions on the A-A' line shown in FIG. 8. It should be noted that the scale sizes may be made different between the constituents in each of the drawings below, if necessary, for the sake of an eye-friendly view of each of the constituents.

FIG. 1 shows a configuration example of a projector 100 according to the present embodiment.

The projector 100 is provided with an illumination optical system 10, a light valve 11 (a light modulation element), and a projection lens 13. The illumination optical system 10 is for generating light for illuminating a light valve 11 (the light modulation element) formed of, for example, a liquid crystal display element having a pixel structure or a micromirror array element having a plurality of movable mirrors in a form of an array.

Hereinafter, a configuration of the illumination optical system forming a characterizing portion of the invention will be explained in detail.

The illumination optical system 10 of the present embodiment is composed mainly of three light source sections including one first light source section 1 and two second light source sections 2a, 2b, a truncated quadrangular pyramid-shaped reflector 3 (an optical axis conversion element), a combining lens 4, and an integrator section 5 (an integrator optical system).

The three light source sections 1, 2a, 2b each have the same configuration provided with a light emitting lamp 7 and a reflector 8. As the light emitting lamp 7, a high-pressure mercury lamp, a metal halide lamp, a xenon lamp, a light emitting diode (LED), and so on can be used, and as the reflector 8, an ellipsoidal reflector having a reflecting surface with an ellipsoidal shape can preferably be used. It should be noted that it is also possible to use a combination of a paraboloidal reflector having a reflecting surface with a paraboloidal shape and a condenser lens instead of the ellipsoidal reflector.

The ellipsoidal reflector 8 has two focal positions, namely a first focal position and a second focal position. The light emitting lamp 7 is disposed so that the light emitting point of the light emitting lamp 7 is located at the first focal position of the ellipsoidal reflector 8. It should be noted that since light emitters such as the light emitting lamp 7 have a stereoscopic light emitting region having luminance varying with the position in the space, it is appropriate to assume the barycentric position of the luminance as the light emitting point. According to such an arrangement, the reflector 8 reflects and at the same time condenses the light emitted from the light emitting lamp 7. Further, the light emitted from the light emitting lamp 7 is filtered by an UV/IR protection filter 9 to remove unnecessary ultraviolet light and infrared light therefrom, and then focused at the second focal position to form an image (a converged spot) of the light emitter. Since this image is a real image, it is possible to regard this image as the secondary light source with respect to the original light emitter. Therefore, in the following optical system, the light emitted from the light emitter, which is normally located at a distant position, can be treated as the light emitted from the secondary light source.

Figure 2:
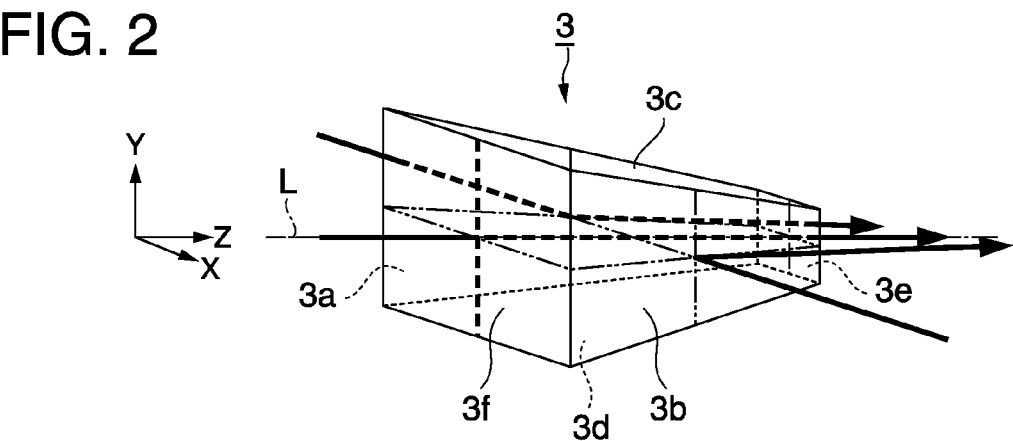
FIG. 2 is a diagram showing a configuration example of a reflector used in the illumination apparatus of the present embodiment.

FIGS. 2, 3A, 3B, and 4A through 4C show configuration examples of the optical axis conversion element. The truncated quadrangular pyramid-shaped reflector 3 (the optical axis conversion element) shown in FIG. 2 is an optical element provided with two reflecting surfaces 3a, 3b substantially opposed to each other on both side surfaces, two reflecting surfaces 3c, 3d substantially opposed to each other on an upper and lower surfaces, and two transmissive end planes 3e, 3f perpendicular to the illumination optical axis L. In other words, the truncated rectangular pyramid-shaped reflector 3 of the present embodiment has the two transmissive end planes 3e, 3f (a pair of parallel planes) arranged in parallel to each other so as to be perpendicular to the illumination optical axis L, and the four reflecting surfaces 3a, 3b, 3c, 3d (surface reflecting planes) tilted to have predetermined angles with the two transmissive end planes 3e, 3f (or the illumination optical axis L). Hereinafter, the transmissive end plane with a relatively small area is referred to as a "small transmissive end plane" 3e, and the transmissive end plane with a relatively large area is referred to as a "large transmissive end plane" 3f, if necessary.

The light beam from the first light source section 1 arranged on the illumination optical axis L is transmitted through the two transmissive end planes (the large transmissive end plane 3f and the small transmissive end plane 3e) of the truncated quadrangular pyramid-shaped reflector 3, and proceeds in the Z direction. Further, although described later in detail, the light beams emitted from the two second light source sections 2a, 2b, which are not positioned on the illumination optical axis L, and then proceeding along the X axis are respectively reflected by the reflecting surfaces 3a, 3b on the side surfaces, and then proceed in directions intersecting with the illumination optical axis L. Therefore, the light beams from the three light source sections 1, 2a, 2b are combined into a substantially single light beam on the illumination optical axis L, and then proceed in substantially the same direction. Therefore, the truncated quadrangular pyramid-shaped reflector 3 needs to at least have the same number of reflecting surfaces on the side surfaces as the number (two in the present embodiment) of the light source sections 2a, 2b not positioned on the illumination optical axis L.

In the case of the present embodiment, although two reflecting surfaces are enough because there are only two second light source sections 2a, 2b, the truncated quadrangular pyramid-shaped reflector 3 shown in FIG. 2 has the four reflecting surfaces 3a, 3b, 3c, 3d. Each of these four reflecting surfaces has a trapezoidal shape with a longer side on the large transmissive end plane 3f side and a shorter side on the small transmissive end plane 3e side when viewed from a direction perpendicular to the reflecting surface. In other words, all of the reflecting surfaces 3a, 3b, 3c, 3d are tilted at predetermined angles with the large transmissive end plane 3f and the small transmissive end plane 3e (or the illumination optical axis L).

Figure 3A:
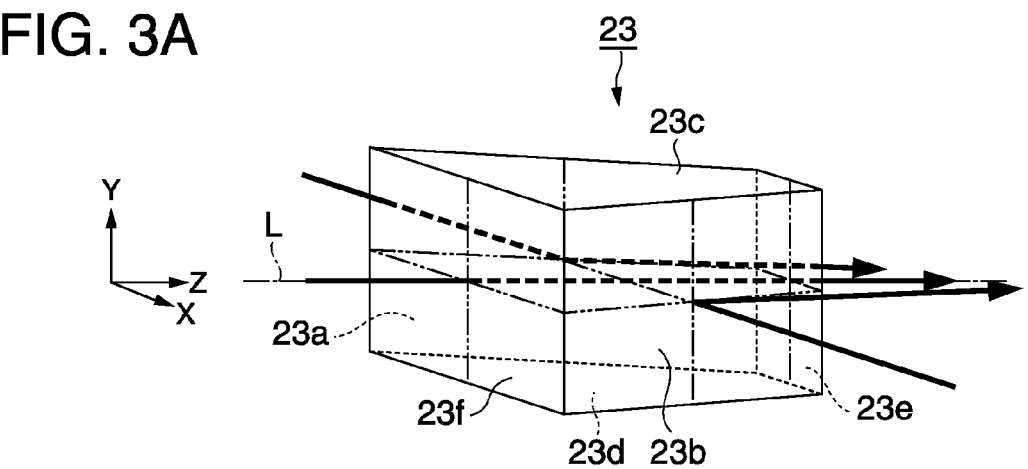
FIGS. 3A and 3B are diagrams showing other configuration examples of the reflector.
Figure 3B:
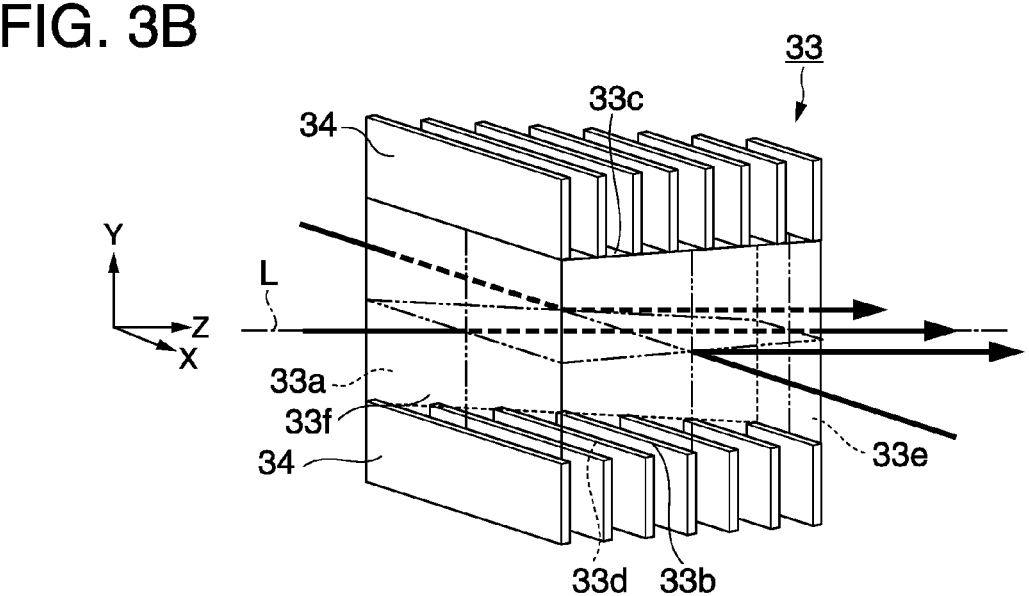

FIGS. 3A and 3B specifically show configuration examples of the optical axis conversion element suitable for the case in which the number of light source sections is three. The reflector 23 (the optical axis conversion element) shown in FIG. 3A has four side surfaces 23a, 23b, 23c, 23d, wherein the two side surfaces 23a, 23b on the sides opposed respectively to the second light source sections 2a, 2b are reflecting surfaces each having a rectangular shape when viewed from a direction perpendicular to the reflecting surface. The two remaining side surfaces 23c, 23d are surfaces not functioning as reflecting surfaces, and each have a trapezoidal shape with a longer side on the large transmissive end plane 23f side and a shorter side on the small transmissive end plane 23e side when viewed from the direction perpendicular to the side surface. In other words, only the two reflecting surfaces 23a, 23b are tilted at predetermined angles with the large transmissive end plane 23f and the small transmissive end plane 23e (or the illumination optical axis L). According to the configuration shown in FIG. 3A, since the large areas can be provided to the reflecting surfaces 23a, 23b, it is suitable for improving the radiation performance.

Alternatively, as a modified example of the reflector 23 shown in FIG. 3A, a reflector 33 shown in FIG. 3B is provided with radiation fins 34 (radiation members) attached respectively to two side surfaces (the upper and lower surfaces) 33c, 33d not functioning as reflecting surfaces. According to this configuration, the radiation performance of the reflector 33 can further be improved. In addition, the reflector 33 has side surfaces 33a and 33b (similar to side surfaces 23a and 23b of FIG. 3A) and transmissive end planes 33e and 33f (similar to transmissive end planes 23e and 23f of FIG. 3A).

Figure 4A:
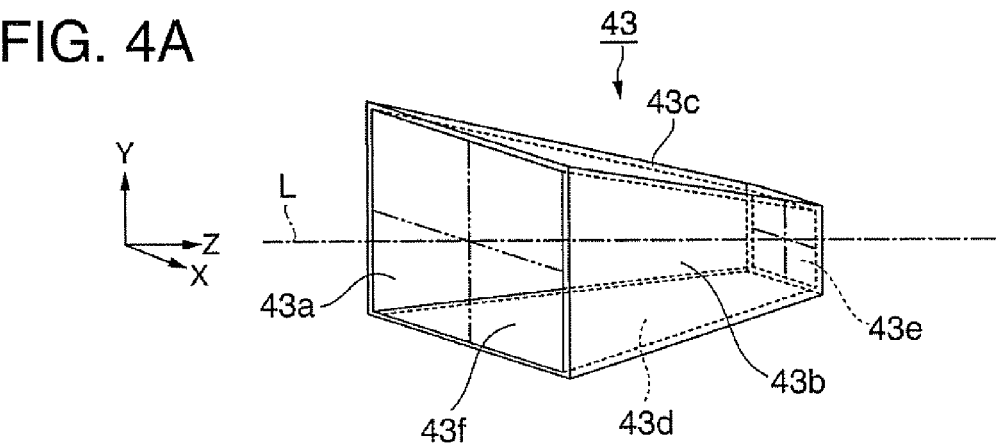
FIGS. 4A through 4C are diagrams showing still other configuration examples of the reflector.

As another form of the optical axis conversion element, a reflector 43 shown in FIG. 4A can be used. The reflector 43 is a tubular reflector with a tapered shape, having a hole penetrating in the direction of the illumination optical axis L and a plurality of reflecting surfaces 43a, 43b, 43c, 43d as the exterior surfaces thereof. This reflector 43 can be manufactured by, for example, bonding four plate members each other, each having a reflecting surface on one surface. In this reflector 43, it is assumed that virtual planes on the light entrance side and the light exit side each formed of four sides of the plate members are called "transmissive end planes." In other words, the inside of the four plate members forming the truncated quadrangular pyramid-shaped reflector 43 is made as a hollow section penetrating therethrough in the direction along which the illumination optical axis L extends, and there is no physical interfacial surface at each of the transmissive end planes denoted with the reference symbols 43e, 43f.

Figure 4B:
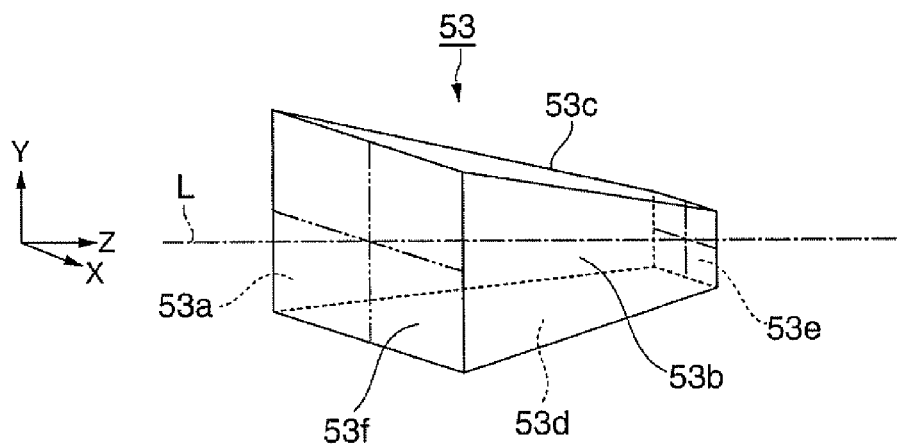

Alternatively, a reflector 53 shown in FIG. 4B can be used. The reflector 53 is a solid-core reflector shaped like a prism having a truncated polygonal pyramid-shaped external form, having reflecting surfaces 53a, 53b, 53c, 53d formed on the side surfaces of a truncated quadrangular pyramid member made of a homogenous transparent medium, and transmissive end planes 53e and 53f.

Figure 4C:
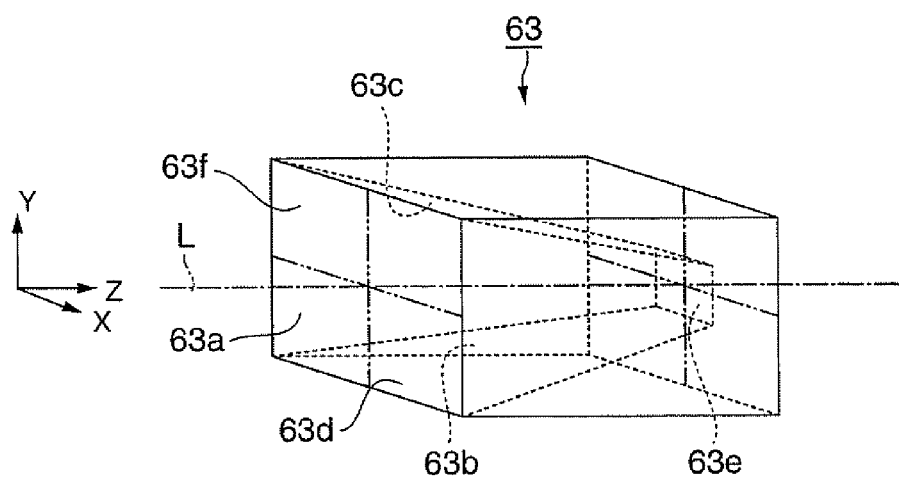

Alternatively, a reflector 63 shown in FIG. 4C can be used. The reflector 63 is a rectangular solid reflector obtained by hollowing the inside of a rectangular solid made of a homogenous transparent medium so as to form a truncated quadrangular pyramid-shaped hollow section to form reflecting surfaces 63a, 63b, 63c, 63d on the inside wall surfaces. Also in the reflector 63, there is no physical interfacial surface at each of the transmissive end planes denoted with the reference symbols 63e, 63f.

The reflector 43 shown in FIG. 4A is formed of the tubular member, and therefor, is suitable for weight saving and cost reduction of the element. Further, since the physical interfacial surfaces do not exist on the transmissive end planes 43e, 43f of the reflector 43, a light loss by the interfacial reflection and so on with respect to the light from the first light source section 1 can be reduced. Further, it is suitable for radiating the heat generated in the reflecting surfaces 43a, 43b, 43c, 43d, and is suitable for improving the heat resistance property. The reflectors 53, 63 shown in FIGS. 4B and 4C have a plurality of reflecting surfaces formed integrally, and therefore, is suitable for improving the installation accuracy of the reflecting surfaces. Further, the reflector 63 shown in FIG. 4C provides advantages that a high reflectance can be obtained by setting the installation angles of the reflecting surfaces so as to satisfy the total reflection condition, and that the large areas can be provided to the reflecting surfaces on the side surfaces, and it is suitable for improving the radiation performance. Further, since the physical interfacial surfaces do not exist on the transmissive end planes 63e, 63f, a light loss by the interfacial reflection and so on with respect to the light from the first light source section 1 can be reduced.

Since each of the reflectors is disposed at or extremely close to a position on which the light is focused as described later, it is desirable to form the reflectors with a medium having a properties such as a superior heat resistance property, a high thermal conductivity, and a low coefficient of thermal expansion, and sapphire, quartz, quartz glass, and so on can preferably be used. Further, when using the transparent medium as in the case of the reflectors 53, 63 shown in FIGS. 4B and 4C, it is desirable to form the reflector with a medium having a high transparency.

The reflecting surface of each of the reflectors is provided with a reflecting film formed of, for example, a dielectric multilayer film, an aluminum film, or a silver film, and reflects the light with high efficiency. Since the reflector is disposed at or extremely close to the position on which the light is focused, the reflecting film superior in heat resistance is used desirably therefor, and the multilayer film obtained by alternately stacking layers made of tantalum pentoxide ($Ta_2O_5$) or niobium pentooxide ($Nb_2O_5$) and silicon dioxide ($SiO_2$) layers is advantageous in that regard. It should be noted that in the case in which the reflecting surfaces of the reflector 63 shown in FIG. 4C are installed so as to satisfy the total reflection condition, there is no need for forming the reflecting films on these reflecting surfaces.

It should be noted that in the case of providing the physical transmissive end plane as shown in FIGS. 4B and 4C, it is desirable to form a antireflection film formed of a dielectric multilayer film or the like on the transmissive end plane.

Since the light with extremely strong intensity is focused on the reflecting surface, it is important to prevent grit and dust from attaching on the reflecting surface. The reason therefor is that the reflecting surface is damaged by burning of the grit and dust attached on the reflecting surface, which causes deterioration in the reflection performance and shorter operation life. Therefore, in order for preventing the attachment of grit and dust, such measures as continuously applying clean and cool air to the reflector, or disposing the reflector in a closed space where grit and dust are prevented from entering are effective. Specifically, it is possible to manufacture a rectangular solid-shaped housing sealed with six transparent flat plates, for example, and to dispose the reflector in the inside thereof.

The installation position of the truncated quadrangular pyramid-shaped reflector 3 will be explained with reference to FIG. 1.

The truncated quadrangular pyramid-shaped reflector 3 is installed so that the image (the converged spot) of the light emitter formed by the first light source section 1 is located on or in the vicinity of the small transmissive end plane 3e (i.e., on or in the vicinity of the light exit end). Further, the truncated quadrangular pyramid-shaped reflector 3 is installed so that the images (the converged spots) of the two light emitters formed by the two second light source sections 2a, 2b are located on or in the vicinity of the respective reflecting surfaces 3a, 3b. Therefore, it is desirable that the reflecting surfaces 3a, 3b have a size equivalent to or even larger than the size of the converged spot.

It should be noted that it is also possible to install the reflector so that the image (the converged spot) of the light emitter by the first light source section 1 is located at a position slightly shifted towards the light source section from the end of the small transmissive end plane 3e. According to such a configuration, the distance between the position of the image (the converged spot) of the light emitter and the combining lens 4 described later can be made substantially equal between the first light source section 1 and the two second light source sections 2a, 2b. Therefore, the angular distribution of the combined light beam emitted from the combining lens 4 can be prevented from spreading.

Here, since the optical axes of the light beams emitted from the second light source sections 2a, 2b are folded on the reflecting surfaces 3a, 3b, respectively, the optical axes to be folded on the reflecting surfaces 3a, 3b are referred to as incident optical axes (of the light beams entering the truncated quadrangular pyramid-shaped reflector 3) and denoted with the reference symbols a1, b1, respectively. Further, the optical axes having been folded on the reflecting surfaces 3a, 3b are referred to as exit optical axes (of the light beams emitted from the truncated quadrangular pyramid-shaped reflector 3) and denoted with the reference symbols a2, b2, respectively.

The two second light source sections 2a, 2b are arranged so that the incident optical axes a1, b1 thereof are perpendicular to the illumination optical axis L, respectively. Further, the three light source sections 1, 2a, 2b are disposed on substantially the same plane (the X-Z plane in FIG. 1) roughly parallel to a plane, which is parallel to a long side of the light valve 11 as an illumination object and includes the illumination optical axis L. In correspondence therewith, the two reflecting surfaces 3a, 3b substantially opposed to each other across the Y-axis of the truncated quadrangular pyramid-shaped reflector 3 are formed so as to be at a predetermined angle, for example, 45+$\alpha$/2 degree with the illumination optical axis L. Therefore, the exit optical axes a2, b2 of the second light source sections 2a, 2b, which have been folded on the reflecting surfaces 3a, 3b, respectively, come into conditions of forming angles of +$\alpha$ and −$\alpha$ with the illumination optical axis L. On the other hand, regarding the first light source section 1, both of the incident optical axis and the exit optical axis substantially match with the illumination optical axis L.

It should be noted that the angle the reflecting surfaces 3a, 3b of the truncated quadrangular pyramid-shaped reflector 3 form with the illumination optical axis L is not limited to 45+$\alpha$/2 degree. Specifically, it is also possible to appropriately set the angles the reflecting surfaces 3a, 3b form with the illumination optical axis L, and the angles the incident optical axes a1, b1 to be folded on the reflecting surfaces 3a, 3b form with the illumination optical axis L so that the exit optical axes a2, b2 of the second light source sections 2a, 2b form angles of +$\alpha$ and −$\alpha$ with the illumination optical axis L.

According to the arrangement described above, the secondary light source of the first light source section 1 is formed on the small transmissive end plane 3e of the truncated quadrangular pyramid-shaped reflector 3. On the two reflecting surfaces 3a, 3b of the truncated quadrangular pyramid-shaped reflector 3, which are substantially opposed to each other, there are formed the secondary light sources of the corresponding second light source sections 2a, 2b. Further, diverging light beam with the same angle as in the converging process is emitted from each of these secondary light sources. The diverging light beams emitted from the three converged spots enter the combining lens 4 to be converted into light beams substantially parallel to the respective principal rays, and emitted as a combined light beam. It is desirable to use an aspherical lens or a compound lens composed of a plurality of lenses as the combining lens 4, from the viewpoint of easiness in reducing the optical aberration when collimating the diverging light beam.

Here, as described above, the exit optical axes a2, b2 having been folded on the reflecting surfaces 3a, 3b form the angles of +$\alpha$ and −$\alpha$ with the illumination optical axis L. Hereinafter, $\alpha$ is called a combining angle. In other words, the exit optical axes a2, b2 intersect the illumination optical axis L, namely the exit optical axis of the first light source section 1 at a predetermined combining angle $\alpha$ with each other. The positions at which the exit optical axes a2, b2 of these second light source sections 2a, 2b intersect with the exit optical axis from the first light source section 1 are close to an entrance surface of a first lens array 15 forming the integrator section 5. In other words, the positions at which the exit optical axes a2, b2 of the second light source sections 2a, 2b and the exit optical axis from the first light source section 1 intersect with each other are close to the exit surface of the combining lens 4. On this occasion, the light beams from the three light source sections 1, 2a, 2b enter the entrance surface of the first lens array 15 in a substantially overlapped condition. Conversely, the combining angle of the exit optical axes a2, b2 of the second light source sections 2a, 2b with respect to the illumination optical axis L is determined so that the light beams from the three light source sections 1, 2a, 2b are substantially overlapped on the entrance surface of the first lens array 15. According to such a configuration, since downsizing of the diameter of the combined light beam can be realized, it is suitable for improving the illumination efficiency on the posterior side (the projection lens 13 side) of the first lens array 15, and downsizing of the integrator section 5 can be achieved.

It should be noted that the positions at which the exit optical axes a2, b2 of the second light source sections 2a, 2b and the exit optical axis from the first light source section 1 intersect with each other are assumed here to be close to the exit surface of the combining lens 4, but are not so limited. The positions at which the exit optical axes intersect with each other can be set to be arbitrary positions between the truncated quadrangular pyramid-shaped reflector 3 and the light valve 11. For example, the positions can be set on the entrance surface or the exit surface of the first lens array 15, a second lens array 16, an superimposing lens 17, or a collimating lens 18 described later. The more the positions at which the exit optical axes intersect with each other are distant from the truncated quadrangular pyramid-shaped reflector 3, the smaller the combining angle $\alpha$ can be set, and therefore, the narrower the spread of the angular distribution of the combined light beam emitted from the combining lens 4 can be made, and the more suitable it is for improving the illumination efficiency on the posterior side (the projection lens 13 side) of the combining lens 4.

On the other hand, since the light beam from the first light source section 1 located on the illumination optical axis L is combined with the light beams from the second light source sections 2a, 2b with the predetermined combining angle α, the angular distribution of the combined light beam with respect to the light beams entering the combining lens 4 from the respective light source sections 1, 2a, 2b spreads in the direction (the X direction in this example) along which the light beams from the respective light source sections 1, 2a, 2b are combined as shown in FIG. 6. Since the expansion of the angular distribution causes degradation in the illumination efficiency on the posterior side of the combining lens, it becomes important to prevent the angular distribution of the combined light beam from expanding.

In order for preventing the angular distribution of the combined light beam from expanding, it is required to reduce the combining angle of the exit optical axes a2, b2 with respect to the illumination optical axis L. However, as described above, since the light emitter of the light emitting lamp 7 has a finite size, a converged spot having a diameter W0 shown in FIG. 5 is formed at the secondary focal position of the reflector 8 having an ellipsoidal shape, and the size of the converged spot limits the combining angle α. Specifically, if the combining angle α is set to be smaller than a certain predetermined value, there is caused a light beam proceeding straight towards the opposed second light source sections 2a, 2b without being reflected by the reflecting surfaces 3a, 3b of the truncated quadrangular pyramid-shaped reflector 3. Therefore, the amount of the light beam proceeding towards the combining lens 4 is reduced, thus the illumination efficiency is degraded.

However, as shown in FIG. 5, the light intensity distribution in the converged spot has an intensity distribution shape nonlinear in the radial direction thereof. Therefore, by setting the combining angle α based on the diameter W1 excluding the area where the light intensity drops to 10% through 20% of the peak intensity, it is possible to narrow the diameter of the combined light beam while suppressing the reduction of the amount of light beam proceeding towards the combining lens 4, thereby improving the illumination efficiency in the posterior part (on the projection lens 13 side) of the combining lens 4.

Among the light beams entering the combining lens 4 from the light source sections 1, 2a, 2b and the combined light beam emitted from the combining lens 4, the light beam emitted from the first light source section 1 has the strongest light intensity, and the peak intensity position thereof is located approximately on the illumination optical axis L as shown in FIG. 6. Further, since the exit optical axes a2, b2 intersect with the illumination optical axis L at the combining angle α with each other, the intensities of the light beams emitted from the two second light source sections 2a, 2b have the distributions having the peak intensity positions at the angles of −α and +α, respectively. Therefore, the combined light beam having the intensity distribution (illustrated with the chain double-dashed line) obtained by combining these distributions is emitted from the combining lens 4. In other words, the light beam with the intensity, which has the peak on the illumination optical axis L, and decreases as the distance from the illumination optical axis L increases, is emitted from the combining lens 4.

The combined light beam emitted from the combining lens 4 is input to the integrator section 5 to be converted into a light beam having a substantially even illuminance distribution on the illumination object, and illuminates the light valve 11 as the illumination object. The integrator section 5 is configured mainly including the first lens array 15, the second lens array 16, the superimposing lens 17, and the collimating lens 18. The first lens array 15 and the second lens array 16 are light collecting elements each having the same number of small lenses arranged in a matrix, and each of the small lenses forming the first lens array 15 has a focal distance substantially the same as the distance between the first lens array 15 and the second lens array 16, and has a contour shape substantially similar to the display area of the light valve 11 as the illumination object. The focal distance of each of transmission lenses forming the second lans array 16 is set so that the first lens array 15 and the illumination object (the light valve 11) have a substantially conjugate relationship with each other. Further, the contour shape of each of the transmission lenses can be made the same as that of the small lens of the first lens array 15, or can also be appropriately modified in the outer shape or increased in size, thereby improving the light use efficiency.

The combined light beam is input to the first lens array 15 to be divided into a plurality of partial light beams, and then collected in the corresponding transmission lenses of the second lens array 16 to form the images (the light source images) of the light emitters of the respective light source sections. FIG. 7 schematically shows the conditions of light source image formation in the second lens array 16. The light source images corresponding to the combined light beam are formed in each of the transmission lenses. The size and the luminance of each of the light source images correspond to the solid angle and the light intensity of the light beam input from each of the light source sections 1, 2a, 2b to the corresponding small lenses of the first lens array 15, and therefore, vary in accordance with the location of the transmission lens on the second lens array 16. It should be noted that it is possible to integrate the combining lens 4 and the first lens array 15 with each other, and in such a case, since the lens interfacial surfaces can be eliminated, improvement in light use efficiency by reduction of the light reflection loss on the interfacial surfaces can be achieved.

Further, as shown in FIG. 6, since the angular distribution of the combined light beam expands in the direction (the X direction in this case) in which the light beams from the light source sections 1, 2a, 2b are combined, the light source images formed on the second lens array 16 also form a shape expanded in that direction (the X direction).

It should be noted that although three types of light source images are illustrated in correspondence with the light beams from the three light source sections 1, 2a, 2b in FIG. 7 for the sake of easier understanding, the light source images corresponding respectively to the light source sections overlap with each other to form a single light source image elongated in the X-axis direction in reality except the peripheral area (distant from the illumination optical axis L) of the second lens array 16.

In other words, when the second lens array 16 is viewed from the light source side, the light source image corresponding to the light beam from the second light source section 2b is formed on a slightly left (−X direction) part of each of the transmission lenses, the light source image corresponding to the light beam from the first light source section 1 is formed at the center thereof, and the light source image corresponding to the light beam from the second light source section 2a is formed on a slightly right (+X direction) part thereof. Here, the size and the luminance distribution of the light source image thus formed reflect the angular distribution and the intensity distribution of the light beam passing through the second lens array 16. Therefore, in the light source image group formed by the light beam, which is emitted from the second light source section 2a, and has the exit optical axis a2 intersecting the illumination optical axis L at the combining angle +α, the light source image with the highest luminance is formed on the right side (e.g., at the position of G2a) of the illumination optical axis L. Similarly, in the light source image group formed by the light beam from the second light source section 2b, the light source image with the highest luminance is formed on the left side (e.g., at the position of G2b) of the illumination optical axis L. In the light source image group formed by the light beam from the first light source section 1, the light source image with the highest luminance is formed on the illumination optical axis L (at the position of G1). It should be noted that since these light source images are formed discretely, and the formation positions thereof depend on the number and the arrangement of lenses forming the first lens array 15, the positions (G1, G2a, G2b) of the arrows shown in FIG. 7 and the positions of the light source images with the highest luminance described above do not necessarily match with each other.

The plurality of partial light beams emitted from the second lens array 16 is changed in proceeding direction by the superimposing lens 17, and enters the light valve 11 as the illumination object via the collimating lens 18. Further, the light modulated in the light valve 11 is input to the projection lens 13 (a projection optical system) as the projection light, and transmitted on a screen 20. It should be noted that by using properly decentered transmission lenses in the second lens array, the superimposing lens can be eliminated.

Here, the second lens array 16 and the pupil plane in the projection lens 13 have a substantially conjugate relationship with each other. Therefore, as schematically shown in FIG. 8, a light source image group corresponding to the light source image group formed on the second lens array 16 is formed on the pupil plane. It should be noted that FIG. 8 shows the pupil plane viewed from the exit side of the projection lens 13. Further, rectangular cells illustrated with broken lines imaginarily indicate the transmission lenses of the second lens array 16. Also in this case, since the distributions of the size and luminance of the light source image thus formed reflect the angular distribution and the intensity distribution of the light passing through the pupil plane position of the projection lens 13, the intensity distribution of the light passing through the pupil plane becomes approximately the same distribution as shown in FIG. 9.

In general, the imaging performance of the projection lens is high in the vicinity of the projection optical axis, and drops as the distance from the projection optical axis increases. Here, as is understood from FIG. 9, since the light intensity on the projection optical axis L is the strongest, and the distribution is concentrated in an area roughly centering on the projection optical axis L, it can be said that according to the illumination optical system 10 of the present embodiment, there is realized a light intensity distribution suitable for exerting the original imaging performance of the projection lens, and difficult to incur image quality degradation of the display image. It should be noted that although the illumination optical axis L and the projection optical axis L are originally the same optical axis, in the present specification the optical axis is referred to as the illumination optical axis on the illumination apparatus side and as the projection optical axis on the projection lens side for the sake of convenience.

The pupil diameter of the projection lens 13 desirably has a size including the images (light source images) of all of the light emitters, and therefore, ideally has diameter of the circle denoted with the reference symbol T2 in FIG. 8. However, as is understood from the fact that the size of the image (the light source image) of the light emitter is reduced as the distance from the projection optical axis L increases, the partial light beam passing through the distant area from the projection optical axis L has weak intensity and the amount of light is small. Therefore, by setting the pupil diameter so as to correspond to the diameter of the circle denoted with the reference symbol T1, it is possible to achieve downsizing and cost reduction of the projection lens 13 while suppressing the light loss.

As described hereinabove, according to the illumination optical system 10 of the present embodiment, by using the truncated quadrangular pyramid-shaped reflector 3 in combining the light beams from the plurality of light source sections 1, 2a, 2b, it becomes possible to make the illumination optical axes L, a, b of the light source sections 1, 2a, 2b come into the condition of intersecting with each other in the vicinity of the integrator section 5. Further, it is possible to make the illumination optical axes L, a, b of the light source sections 1, 2a, 2b come into the condition of coming close to each other at the pupil position of the projection lens 13. Thus, it becomes possible to generate the illumination light with an intensity distribution having the maximum intensity at approximately the center thereof, and an angular distribution prevented from expanding using the combined light beam formed of the light beams from the respective light source sections 1, 2a, 2b.

Further, according to the projector 100 using such illumination light, since the angular distribution is prevented from expanding, high light use efficiency can be realized. Further, since a number of light source images formed on the pupil plane of the projection lens 13 are concentrated into the area centered approximately on the projection optical axis L, and are in symmetrical conditions, it is suitable for exerting the imaging performance inherent to the projection lens, and thus the display image with only a little illumination variation and color variation, and superior in evenness can be realized. Further, even in the case in which one or two of the light source sections become unable to light, a significant illumination variation can be prevented from occurring, and improvement in usability can be realized.

It should be noted that although in the present embodiment the projector equipped with the three light source sections is exemplified, in the case in which the truncated quadrangular pyramid-shaped reflector 3 is used, two more second light source sections can be arranged in the Y-axis direction, and the light beams from totally five light source sections can be converted into the light beam proceeding in the Z direction. It is obvious that the number of reflecting surfaces formed on the side surfaces of the reflector is not limited to four. For example, in the case in which the number of light source sections not located on the illumination optical axis L is six, it is possible to use a truncated six-sided pyramid-shaped reflector, and in the case of having eight such light source sections, it is possible to use a truncated eight-sided pyramid-shaped reflector. Further, in the case in which the number of light source sections is increased to more than three, which is the number thereof in the present embodiment, it is desirable to dispose more than half of the light source sections on a plane, which is parallel to a long side of the light valve 11 as an illumination object and includes the illumination optical axis L from the viewpoint of easiness in improving the illumination efficiency.

Second Embodiment

Hereinafter, a second embodiment of the invention will be explained with reference to FIG. 10.

Figure 10:
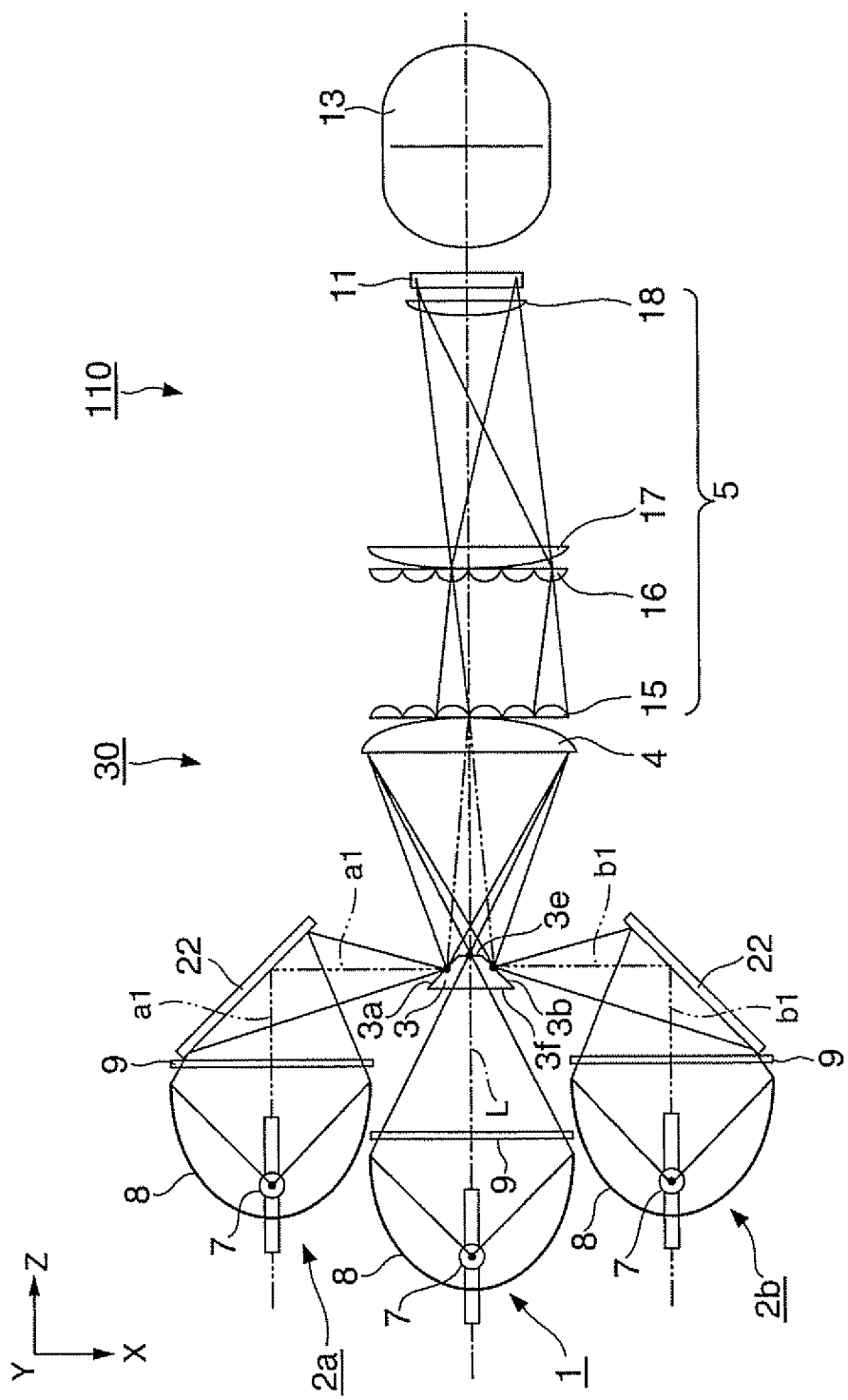
FIG. 10 is a diagram showing a configuration example of a projector equipped with an illumination apparatus according to a second embodiment of the invention.

FIG. 10 is a diagram showing a configuration example of a projector 110 equipped with an illumination optical system according to the embodiment of the invention. It should be noted that in FIG. 10, constituents common to FIG. 1 of the first embodiment are denoted with the same reference symbols, and detailed descriptions therefor will be omitted.

The point in which an illumination optical system 30 of the present embodiment is different from the illumination optical system of the first embodiment (FIG. 1) is that the second light source sections 2a, 2b not located on the illumination optical axis L are disposed laterally adjacent to the first light source section 1, and the light beams from the second light source sections 2a, 2b are respectively reflected by reflecting mirrors 22 (second light source section dedicated optical axis conversion elements) to be guided to the truncated quadrangular pyramid-shaped reflector 3, as shown in FIG. 10. It is also possible to dispose the second light source sections 2a, 2b so that the incident optical axes a1, b1 of the second light source sections 2a, 2b to be reflected by the reflecting mirrors 22 are parallel to the incident optical axis of the first light source section 1, but it is not necessarily required that the incident optical axes a1, b1, of the second light source sections 2a, 2b become parallel to the incident optical axis of the first light source section 1.

It is desirable to use dichroic mirrors (cold mirrors) reflecting only necessary light while transmitting unnecessary light such as ultraviolet light or infrared light as the reflecting mirrors 22. Thus, heat generation in the truncated quadrangular pyramid-shaped reflector 3 and the various lenses can be suppressed, and depending on circumstances, the UV/IR protection filters 9 disposed on the exit side of the light source sections 2a, 2b can be eliminated. It is obvious that mirrors without filter function can also be used as the reflecting mirrors 22.

In the projector 110 of the present embodiment, the arrangement directions of the three light source sections 1, 2a, 2b can be made the same by the reflecting mirrors 22 intervening therebetween. Therefore, it is possible to install one cooling device, for example, behind the reflectors 8 for three light source sections 1, 2a, 2b to make the flow directions of the cooling air the same. Thus, the flow of the cooling air is smoothed, it becomes possible to realize downsizing of the cooling device, improvement of the cooling efficiency, reduction of the noise of the fan or the like when cooling, and so on. It is obvious that the configuration of reflecting the light beam from the first light source section 1 by the reflecting mirror similarly to the case with the second light source sections 2a, 2b to lead the light beam on the illumination optical axis L can also be adopted.

Third Embodiment

Hereinafter, a third embodiment of the invention will be explained with reference to FIGS. 11 through 13.

Figure 11:
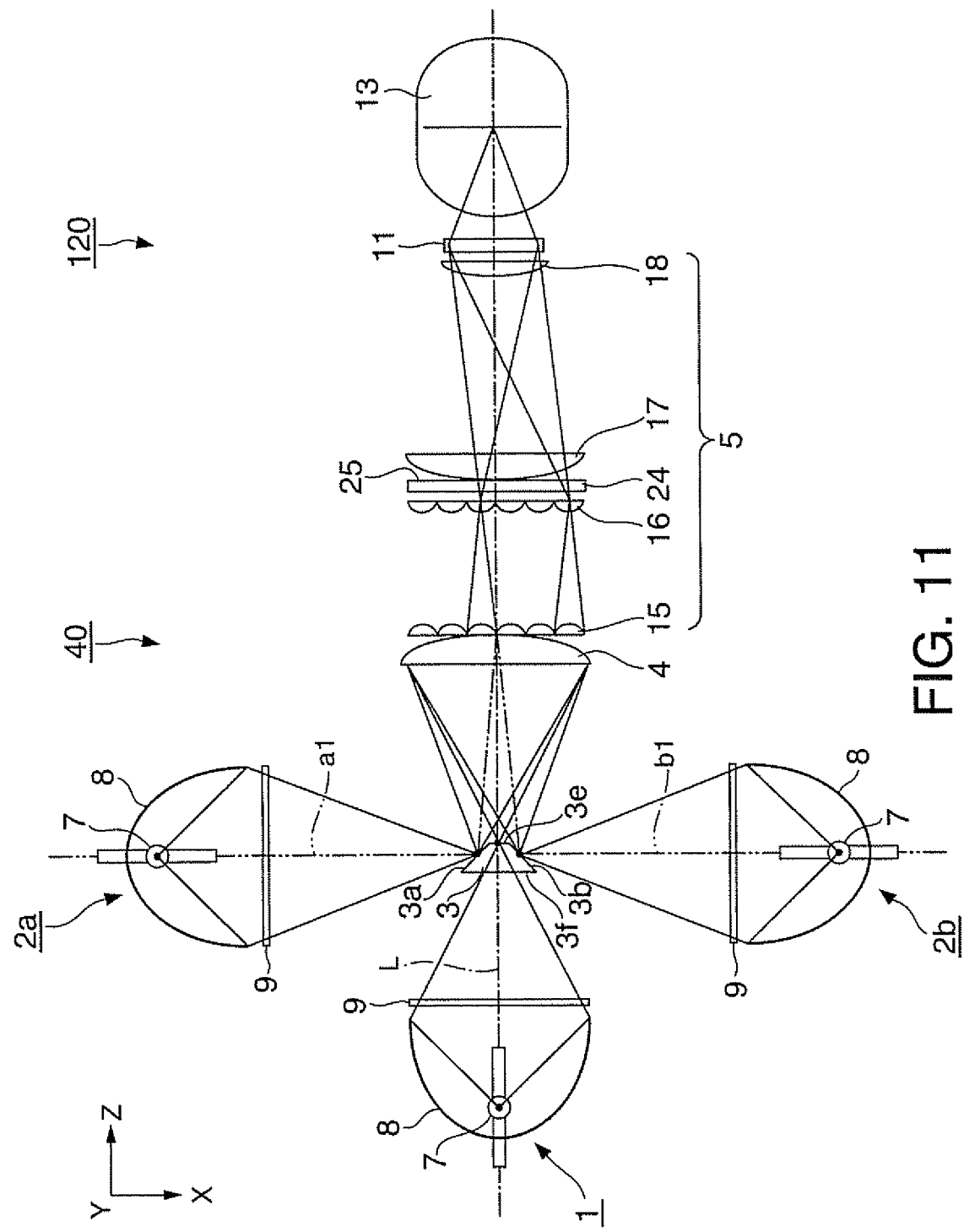
FIG. 11 is a diagram showing a configuration example of a projector equipped with an illumination apparatus according to a third embodiment of the invention.

FIG. 11 is a diagram showing a configuration example of a projector 120 equipped with an illumination optical system according to the embodiment of the invention. It should be noted that in FIG. 11, constituents common to FIG. 1 of the first embodiment are denoted with the same reference symbols, and detailed descriptions therefor will be omitted.

The point in which an illumination optical system 40 of the present embodiment shown in FIG. 11 is different from the illumination optical system 10 of the first embodiment is that there are provided a polarization beam splitting prism array 24 (a PBS array) as a polarization converting optical system and a half-wave plate 25. It should be noted that the polarization converting optical system is a technology known to the public, including the relationship in size with the transmission lenses of the second lens array, and therefore, detailed explanations of the polarization converting optical system will be omitted, and the relationship between the light source sections and the polarization splitting direction will be explained.

Figure 12:
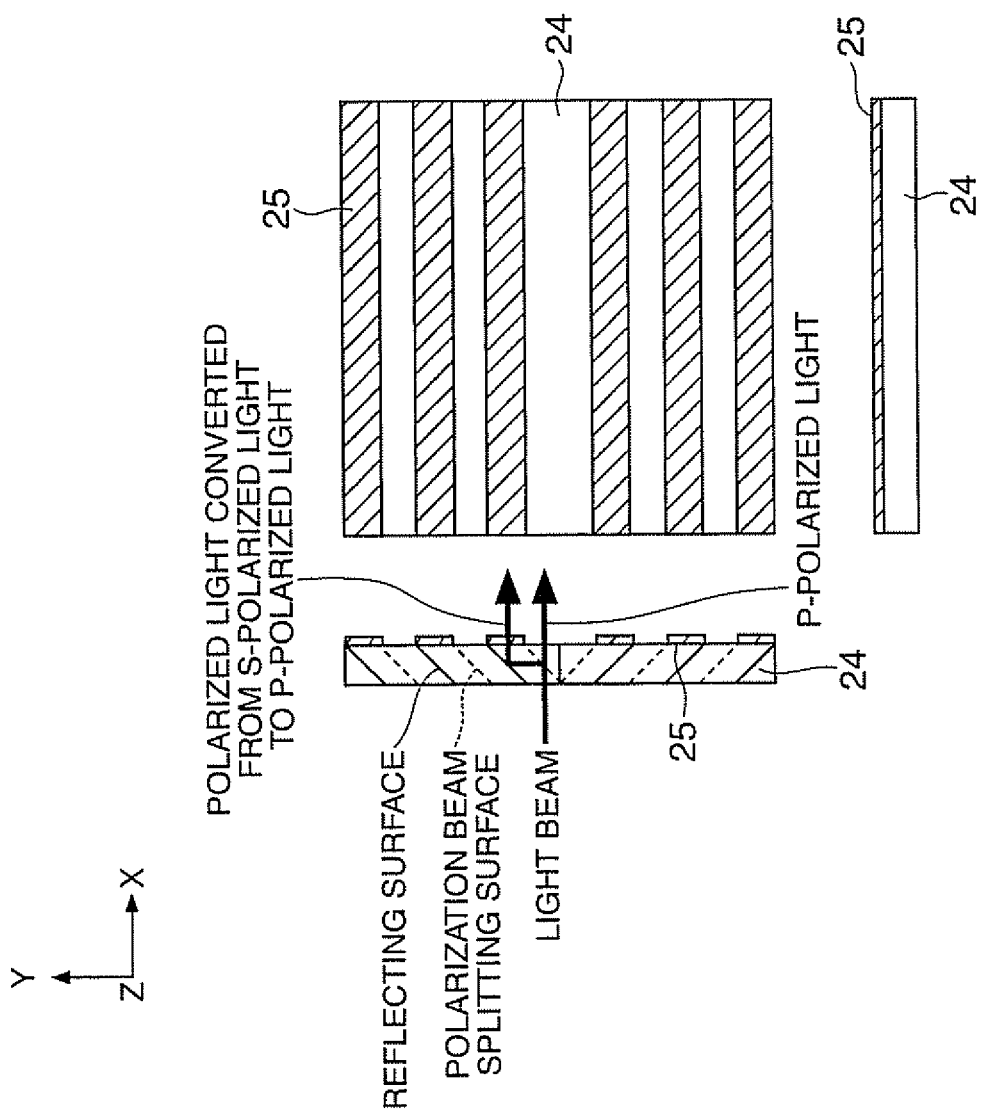
FIG. 12 is a diagram showing a configuration example of a PBS array and a half-wave plate of the illumination apparatus.

FIG. 12 shows a configuration example of the polarization beam splitting prism array 24 (the PBS array) and the half-wave plate 25. Here, the polarization splitting direction in the polarization beam splitting prism array 24 is set to be a direction perpendicular to the plane on which the three light source sections 1, 2a, 2b are disposed. Here, the polarization splitting direction in the polarization beam splitting prism array 24 denotes a direction (the Y-axis direction in FIG. 12) in which a pair of polarization beam splitting surface and reflecting surface are arranged. Further, the plane in which the three light source sections 1, 2a, 2b are disposed denotes a plane on which the light beams from the respective light source sections 1, 2a, 2b are combined with each other. It should be noted that in the case in which the number of light source sections is larger than three, it is desirable to set the polarization splitting direction in the polarization beam splitting prism array 24 to be a direction perpendicular to the plane on which more than half of the light source sections are disposed from the viewpoint of easiness in improving the illumination efficiency.

The combined light beam emitted from the combining lens 4 is converted by the polarization converting optical system into substantially one type of polarized light beam, and enters the light valve 11 as the illumination object. In the case of using a liquid crystal display element, which needs to deal with polarized light in displaying an image, as the light valve 11, it is effective to adopt the polarization converting optical system because the light use efficiency can be improved.

Figure 13:
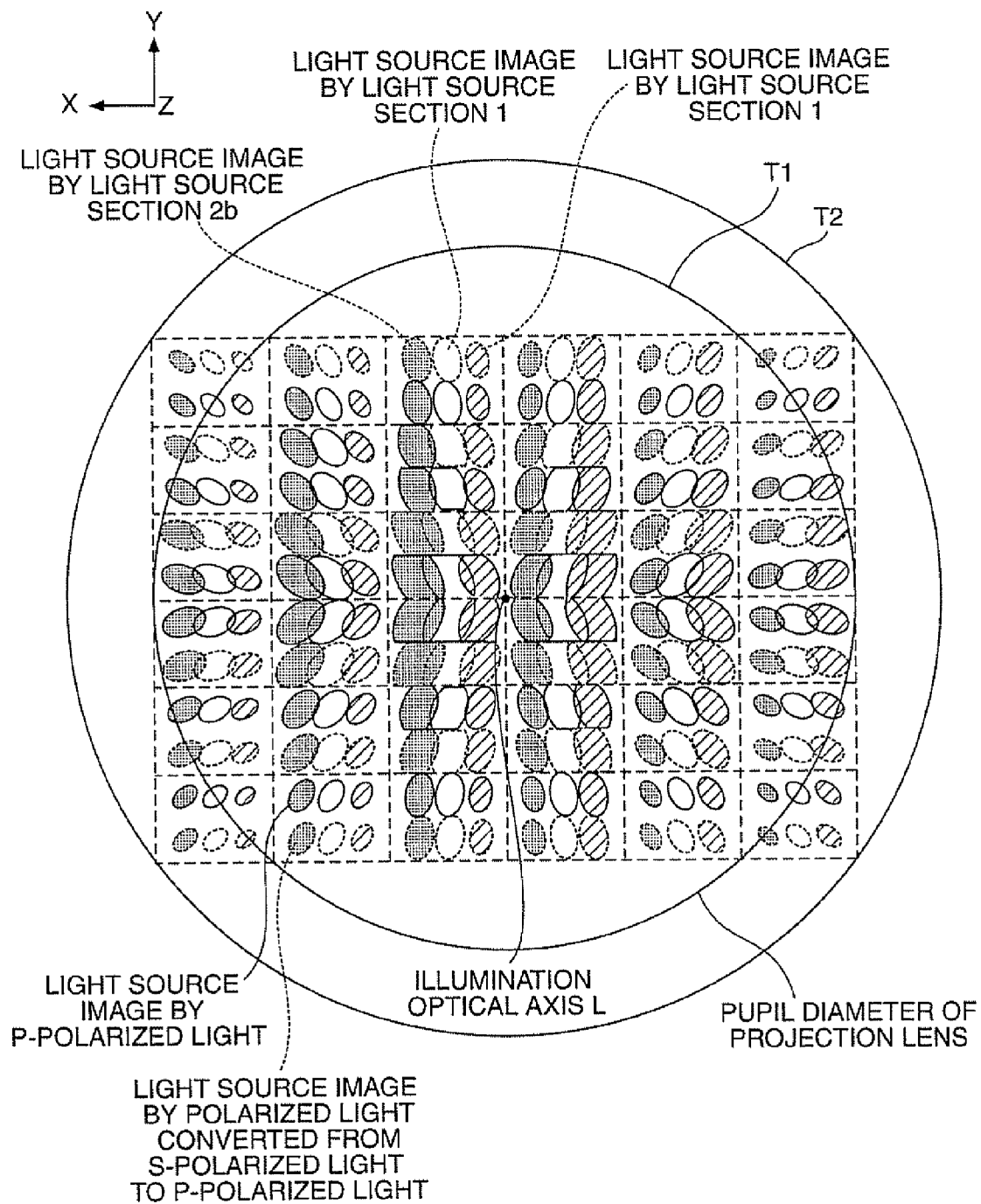
FIG. 13 is a diagram showing conditions of light source image formation on the pupil plane of a projection lens.

Here, conditions of light source image group formation on the pupil plane of the projection lens 13 are schematically shown in FIG. 13. FIG. 13 shows the pupil plane viewed from the exit side of the projection lens 13. The rectangular cells illustrated with the broken lines imaginarily indicate the transmission lenses of the second lens array 16. The images (the light source images by P-polarized light) of the light emitters by the polarized light transmitted through the polarization beam splitting surface of the polarization beam splitting prism array 24 and the images (the light source images by the polarized light obtained by converting the S-polarized light into the P-polarized light) of the light emitters by the polarized light, which is reflected by the polarization beam splitting surface thereof, and converted in the polarization direction by the half-wave plate 25 form a pair, and are formed in the polarization splitting direction (the Y-axis direction) on the pupil plane as the images (the light source images) of the light emitters corresponding respectively to the light source sections 1, 2a, 2b.

In the polarization converting optical system using the polarization beam splitting prism array 24, it is required to spatially split each of the partial light beams, which are generated in the first lens array 15, further in accordance with the difference in the polarization direction. On the other hand, as shown in FIG. 13, in the illumination optical system 40 according to the present embodiment, a corresponding number of types of partial light beams to the number of light source sections 1, 2a, 2b are formed so as to be arranged in a direction in which the light beams from the respective light source sections 1, 2a, 2b are combined. It should be noted that in FIG. 13, the three types of partial light beams are separately illustrated for the sake of easy understanding. Therefore, as described above, by setting the direction of the polarization splitting by the polarization beam splitting prism array 24 to be a direction perpendicular to the combining direction of the light beams, it is possible to make the partial light beams generated due to the number of light source sections and the partial light beams generated by executing the polarization splitting on the partial light beams generated due to the number of light source sections come close to each other, and therefore, the vignetting of the partial light beams in the second lens array 16 and the polarization beam splitting prism array 24 is reduced, thus the light use efficiency can be improved.

As described hereinabove, according to the illumination optical system 40 of the present embodiment, since there is provided the polarization converting optical system for converting the non-polarized light beams emitted from the light source sections 1, 2a, 2b into the light beams with specified polarization states, extremely high light use efficiency can be realized in the projector equipped with the liquid crystal display element required to deal with polarized light beams in addition to the advantages obtained by the illumination optical system of the first embodiment. Further, since the polarization splitting direction in the polarization conversion optical system is appropriately set in consideration of the arrangement of a plurality of light source sections, namely the light source sections 1, 2a, 2b, high light use efficiency can be realized.

It should be noted that the scope of the invention is not limited to the embodiments described above, but various modifications can be executed thereon within the range of the scope or the spirit of the invention. For example, although the truncated quadrangular pyramid-shaped reflector is exemplified as the reflector in the embodiments described above, the reflector is not necessarily limited to the truncated quadrangular pyramid-shaped reflector, and the outer shape thereof is not required to be the truncated polygonal pyramid-shaped reflector providing that the function of transmitting the light beam from the first light source section onto the illumination optical axis, and reflecting the light beam from the second light source section in a direction in which the exit optical axis thereof intersect with the exit optical axis of the light beam from the first light source section. For example, it is also possible that a part of a curved side surface of a truncated cone is cut to form a flat surface, and the flat surface is used as the reflecting surface.

Further, it is not necessarily required that the first light source section 1 is disposed on the illumination optical axis L. For example, it is also possible to dispose a deviation prism 131 (a first light source section dedicated optical axis conversion element) adjacent to the reflector 3 similar to that of the embodiments described above on the light entrance side thereof as shown in FIG. 14A. On this occasion, although not shown in FIG. 14A, the first light source section 1 is disposed at a location shifted from the illumination optical axis L, and the illumination optical axis c of the first light source section 1 is tilted from the illumination optical axis L so that the illumination optical axis L and the illumination optical axis c of the first light source section 1 intersect at an angle different from 90 degrees with each other. In this configuration, the tilt of the illumination optical axis c of the first light source section 1 with respect to the illumination optical axis L is set so that the light beam from the first light source section 1 is refracted when entering the incident end surface 131a of the deviation prism 131, and then emitted from the reflector 3 along the illumination optical axis L. Thus, the light beam from the first light source section 1 proceeds together with the light beams from the two second light source sections 2a, 2b, which have predetermined combining angles with the illumination optical axis L, in substantially the same direction, and the light beam formed by combining these light beams into one light beam can be obtained.

Figure 14B:
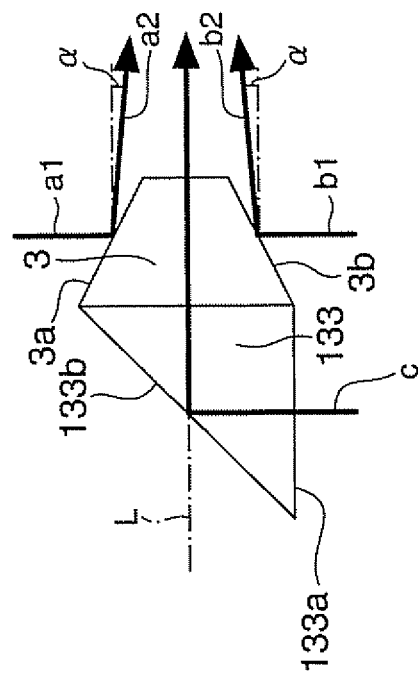
FIGS. 14A and 14B are diagrams showing other configuration examples of the reflector.
Figure 14A:
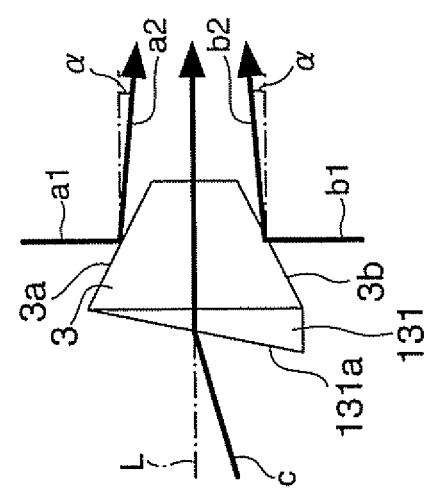

Alternatively, it is also possible to dispose a reflecting prism 133 (a first light source section dedicated optical axis conversion element) adjacent to the reflector 3 similar to those of the embodiments described above, on the light entrance side thereof as shown in FIG. 14B. On this occasion, for example, the first light source section 1 is arranged so that the illumination optical axis L and the illumination optical axis c of the first light source section 1 intersect approximately perpendicular to each other. In this configuration, the light beam from the first light source section 1 is transmitted through the incident end surface 133a of the reflecting prism 133, then reflected by a total reflection surface 133b, and then emitted from the reflector 3 along the illumination optical axis L. Thus, the light beam from the first light source section 1 proceeds together with the light beams from the two second light source sections 2a, 2b, which have predetermined combining angles with the illumination optical axis L, in substantially the same direction, and the light beam formed by combining these light beams into one light beam can be obtained.

It should be noted that it is also possible to adopt a configuration in which the illumination optical axis L and the illumination optical axis c intersect at an angle other than the right angle with each other. The light beam having entered the reflecting prism causes total reflection in the case in which the incident angle to the total reflection surface 133a satisfies the total reflection condition. Therefore, it is preferable to set the shape of the reflecting prism 133 and the arrangement of the illumination optical axis c so as to increase the incident angle to cause total reflection.

According to the configuration shown in FIGS. 14A and 14B, since it is not required to dispose the first light source section 1 on the illumination optical axis L, freedom of the arrangement of the first light source section 1 is enhanced, and in some cases, the size of the illumination apparatus in the direction along the illumination optical axis L can be reduced.

It should be noted that it is also possible to dispose a reflecting mirror at the position of the total reflection surface 133b of the reflecting prism 133 in the configuration shown in FIG. 14B, instead of installing the reflecting prism 133 on the light entrance side of the reflector 3. Also in this case, the same advantages as described above can be obtained.

Further, although in the embodiment described above the reflector, which surface-reflects the light beams from the plurality of second light sources on the first entrance side surfaces to convert the optical axes thereof into the axes having directions intersecting the illumination optical axis L, is exemplified as the optical axis conversion element, the optical axis conversion element is not limited to this configuration. For example, it is also possible to use an optical axis conversion element transmitting the light beams from the plurality of second light source sections through the first entrance side surfaces, and then total-reflecting them on other side surfaces thereof, thereby converting the optical axes thereof into optical axes having directions forming predetermined angles (equivalent to the combining angles) with the illumination optical axis. Alternatively, it is also possible to use an optical axis conversion element refracting the light beams from the plurality of second light source sections in the inside thereof, thereby converting the optical axes thereof into optical axes having directions forming predetermined angles (equivalent to the combining angles) with the illumination optical axis.

Hereinafter, embodiments reflecting the configurations described above will be explained.

Fourth Embodiment

Hereinafter, a fourth embodiment of the invention will be explained with reference to FIGS. 15 through 17.

Figure 15:
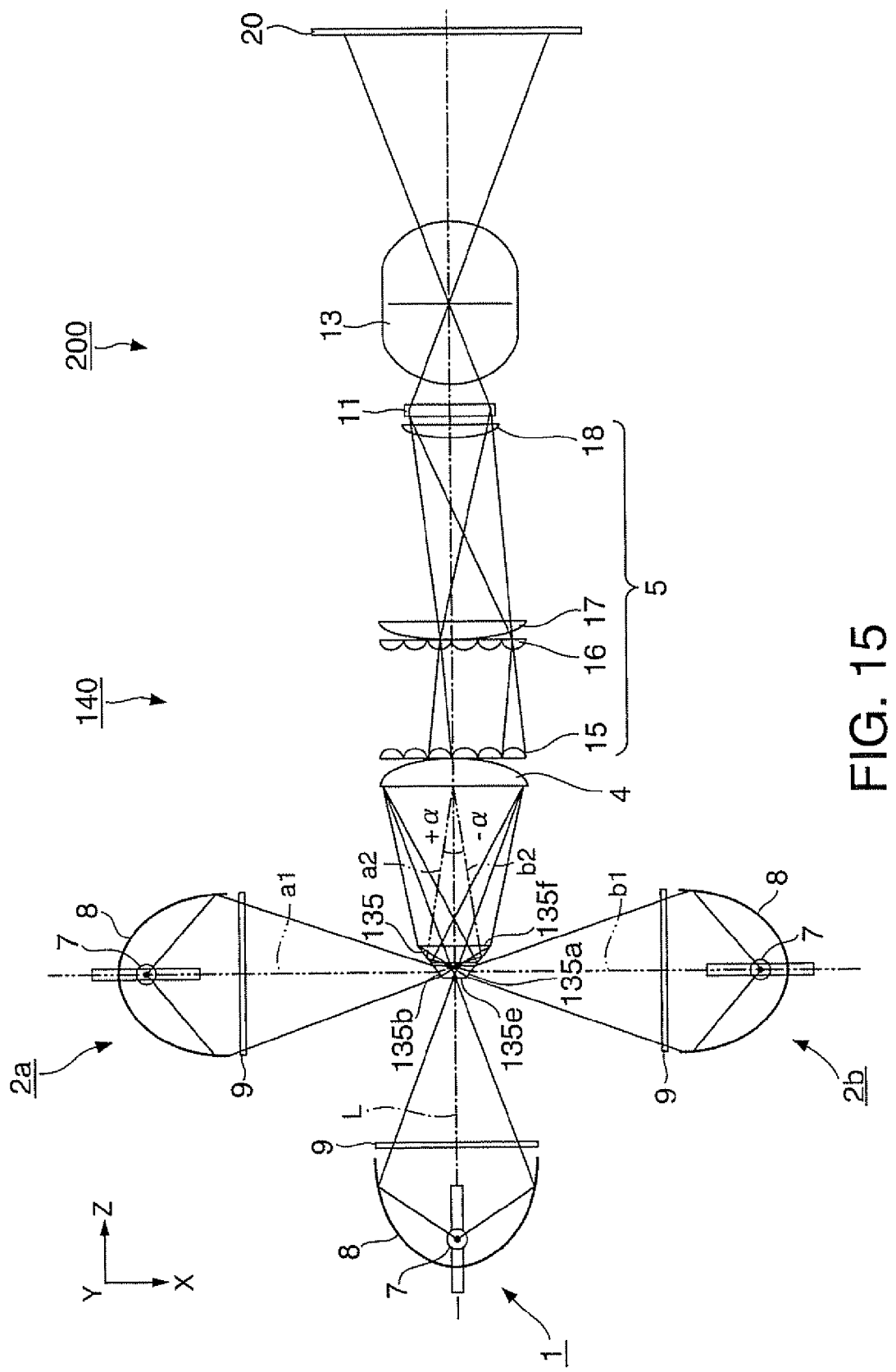
FIG. 15 is a diagram showing a configuration example of a projector equipped with an illumination apparatus according to a fourth embodiment of the invention.

FIG. 15 is a diagram showing a configuration example of a projector equipped with an illumination apparatus according to the embodiment of the invention. The overall configuration of the projector shown in FIG. 15 is approximately common to the projector of the first embodiment shown in FIG. 1, and the principal difference is the configuration of the optical axis conversion element of the illumination apparatus. Therefore, in FIG. 15, constituents common to FIG. 1 of the first embodiment are denoted with the same reference symbols, and detailed descriptions therefor will be omitted.

Figure 16A:
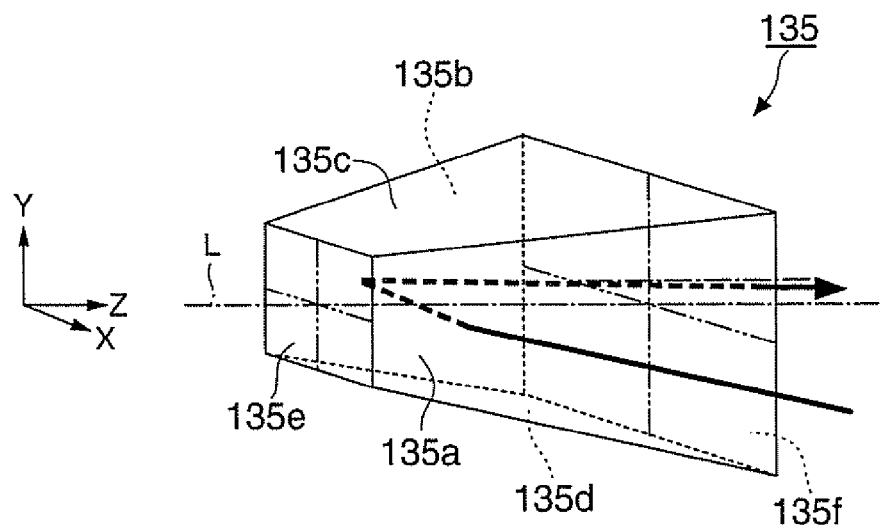
FIGS. 16A and 16B are diagrams showing a configuration example of an optical axis conversion element used in the illumination apparatus of the present embodiment.
Figure 16B:
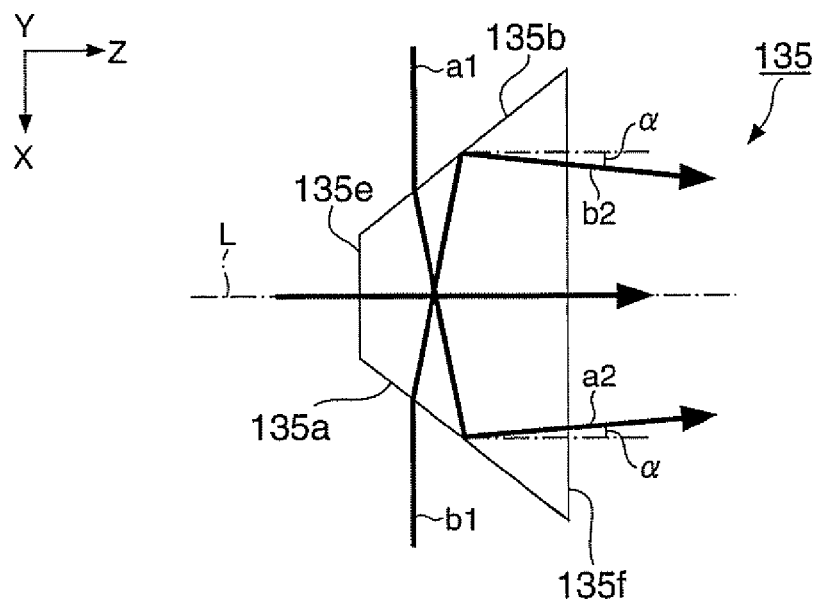

FIGS. 16A and 16B are diagrams showing the optical axis conversion element 135 used in the illumination apparatus 140 of the present embodiment. As shown in these drawings, the optical axis conversion element 135 of the present embodiment is a solid-core transparent member made of a translucent material such as glass, resin, or crystal. The optical axis conversion element 135 has a truncated quadrangular pyramid-like shape, and is provided with antireflection films formed of dielectric multilayer films formed respectively on all of six surfaces 135a through 135f. The optical axis conversion element 135 has two transmitting end surfaces, and the small transmitting end surface 135e with a relatively small area is disposed on the side near to the first light source section 1, while the large transmitting end surface 135f with a relatively large area is disposed on the side far from the first light source section 1. The small transmitting end surface 135e and the large transmitting end surface 135f have a parallel positional relationship with each other, and form a pair of parallel planes approximately perpendicular to the illumination optical axis L. Further, the four side surfaces 135a through 135d are arranged so as to form predetermined angles with an axis passing through an approximate center of the optical axis conversion element 135. In other words, the side surfaces 135a through 135d are disposed with tilts so that the normal lines of the side surfaces 135a through 135d intersect the illumination optical axis L on the exit side (nearer to the projection lens 13 side than the small transmitting end surface 135e) of the optical axis conversion element 135.

As shown in FIG. 15, the light beam from the first light source section 1 located on the illumination optical axis L enters from the small transmitting end surface 135e, and is emitted from the large transmitting end surface 135f along the illumination optical axis L without changing the proceeding direction. On the other hand, the light beams from the second light source sections 2a, 2b not located on the illumination optical axis L enter from the side surfaces 135a, 135b located on the incident optical axes a1, b1 of the second light source sections 2a, 2b, and are refracted upon entrance to slightly change the proceeding directions as shown in FIG. 16B. Further, the light beams from the second light source sections 2a, 2b are totally reflected on the side surfaces 135b, 135a opposed respectively to the entrance side surfaces 135a, 135b to further change the proceeding directions significantly, and then emitted from the large transmitting end surface 135f so that the exit optical axes a2, b2 form predetermined angles with the illumination optical axis L. In other words, the positional relationship between the two side surfaces 135a, 135b and the incident optical axes a1, b1 of the second light source section 2a, 2b is set so that the light beams from the second light source sections 2a, 2b are emitted from the large transmitting end surface 135f in the directions forming predetermined angles (equivalent to the combining angles) with the illumination optical axis L. Thus, the light beams from the plurality of light source sections 1, 2a, 2b having entered the optical axis conversion element 135 from directions different from each other are emitted from one end surface, namely the large transmitting end surface 135f in a condition of being close to each other. In this case, since the angles formed by the exit optical axes a2, b2 of the second light source sections 2a, 2b and the illumination optical axis L are small, the light beams from the plurality of light source sections 1, 2a, 2b are combined into substantially one light beam on the illumination optical axis L.

In the optical axis conversion element 135, among the light beams having entered from the side surface 135a, only the light beam having an incident angle to the side surface 135b satisfying the total reflection condition is totally reflected by the side surface 135b. Similarly, among the light beams having entered from the side surface 135b, only the light beam having an incident angle to the side surface 135a satisfying the total reflection condition is totally reflected by the side surface 135a. Since the higher the refractive index of the transparent member forming the optical axis conversion element 135 is, the smaller the incident angle causing the total reflection becomes, it is desirable to form the optical axis conversion element 135 using a material with a high refractive index. By adopting such an optical axis conversion element 135, the angles formed by the illumination optical axis L and the side surfaces 135a, 135b can be made smaller, and therefore, the size (the size particularly in the X direction) of the optical axis conversion element 135 can be reduced.

The optical axis conversion element 135 needs to be provided with the side surfaces at least as many as, or more than the number of second light source sections 2a, 2b not located on the illumination optical axis L, and it is possible to combine the light beams from totally three or more light source sections. Further, the optical axis conversion element 135 of the present embodiment is suitable for the configuration of combining the light beams from an odd number (three in the present embodiment) of light source sections. In other words, since all of the shapes of the side surfaces 135a through 135d can be made the same in the configuration of the optical axis conversion element 135 of the present embodiment, the element can be worked with relative ease. Further, since the higher the spatial symmetry of the angular distribution and the intensity distribution of a combined light beam is, the more easily the combined light beam can be used, from this viewpoint, it is desirable that the number of corresponding light source sections is an odd number. For example, the optical axis conversion element 135 of the present embodiment shown in FIG. 16A can also be used in the case of combining the light beams from five light source sections. In this case, it is sufficient to dispose the four second light source sections at symmetrical positions centered on the illumination optical axis L, which is suitable for arranging the light source sections.

Figure 17:
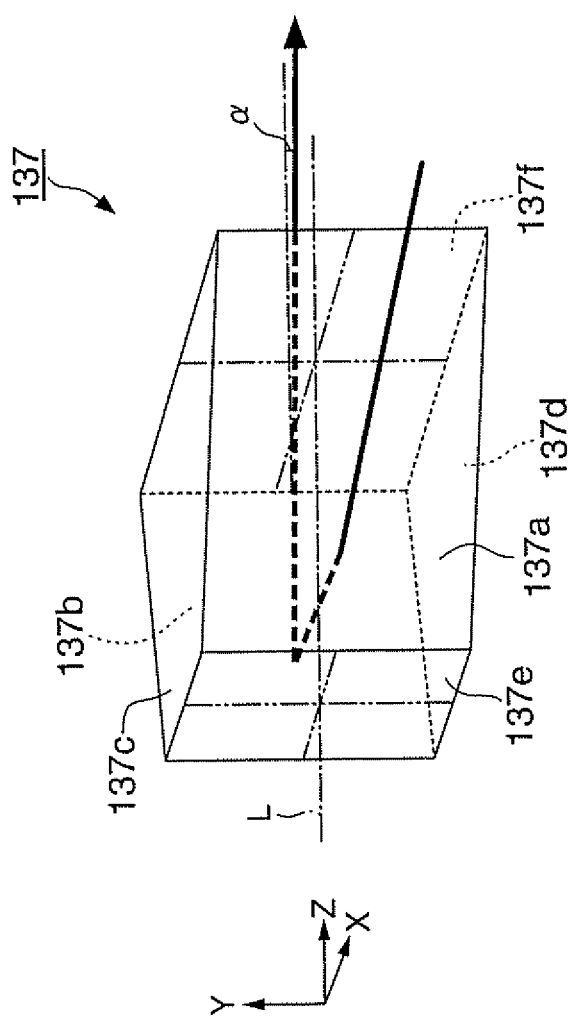
FIG. 17 is a diagram showing another configuration example of the optical axis conversion element.

Further, if it is required only to combine the light beams from the three light source sections as is the case for the present embodiment, it is also possible to adopt a configuration of making side surfaces 137a, 137b to which the light beams from the light source sections are input larger than side surfaces 137c, 137d to which no light beams from the light source sections are input to match the size in the Y direction of a small transmitting end surface 137e with the size in the Y direction of a large transmitting end surface 137f, as shown in FIG. 17. In this case, since the optical axis conversion element 137 becomes to have a shape provided with two pairs of parallel planes opposed to each other, the element can be worked with ease. Further, when focusing attention on heat charge of the optical axis conversion element, the optical axis conversion element 137 shown in FIG. 17 has a large surface area compared to the optical axis conversion element 135 shown in FIG. 16A, and therefore has a preferable heat radiation property, and the heat resistance can be improved.

The installation position of the optical axis conversion element 135 will hereinafter be explained with reference to FIG. 15.

Since the light beams from the light source sections 1, 2a, 2b are focused to form the images (the converged spots) of the light emitters, and then diverge gradually, it is desirable to use the optical axis conversion element 135 at the stage in which the light beam diameters are still small. From such a viewpoint, it is desirable to install the optical axis conversion element 135 at a location where the two converged spots corresponding to the two second light source sections 2a, 2b not located on the illumination optical axis L are formed inside the optical axis conversion element 135, the converged spot corresponding to the first light source section 1 located on the illumination optical axis L is formed extremely close to the small transmitting end surface 135e of the optical axis conversion element 135 as much as possible, and the optical distances from the respective converged spots to the combining lens 4 are equal as possible. Further, the sizes of the small transmitting end surface 135e, the large transmitting end surface 135f, and the side surfaces 135a through 135d are set to be equal to or larger than the light beam diameter so as not to block the light beams to be input thereto. According to the arrangement and the configuration described above, the efficiency at the stage of generating the combined light beam can be improved, and the spread of the angular distribution of the combined light beam can be reduced.

Also in the projector 200 of the present embodiment, since the spread of the angular distribution of the light emitted from the illumination apparatus 140 is suppressed, there can be obtained the same advantage that a high light use efficiency can be realized. Further, in the case of using the optical axis conversion element 135 provided with the function of using the total reflection to change the proceeding directions of the light beams, as is the case for the present embodiment, although the light loss is caused by extremely little light reflection on the end surface on the light entrance side, the loss is hardly caused on the side surfaces on which the total reflection occurs. Therefore, if the light absorption by the transparent member forming the optical axis conversion element 135 is extremely small, heat charge can hardly occur in the optical axis conversion element 135. Therefore, even in the case in which a very high-intensity light beam is input, high durability can be maintained for a long period of time.

It should be noted that in the present embodiment, in the case in which the light beams from the second light source sections 2a, 2b enter along the respective normal lines of the side surfaces 135a, 135b of the optical axis conversion element 135, no refraction is caused when the light beams enter the side surfaces 135a, 135b of the optical axis conversion element 135, and therefore, the proceeding directions are not changed. It is also possible that the second light source sections 2a, 2b and the optical axis conversion element 135 have such a positional relationship with each other. Further, also in the case of the present embodiment, it is possible to adopt a configuration in which a deviation prism or a reflecting prism as shown in FIGS. 14A and 14B is installed on the entrance side of the optical axis conversion element 135, and the first light source section 1 is not located on the illumination optical axis L.

Fifth Embodiment

Hereinafter, a fifth embodiment of the invention will be explained with reference to FIGS. 18 through 20.

Figure 18:
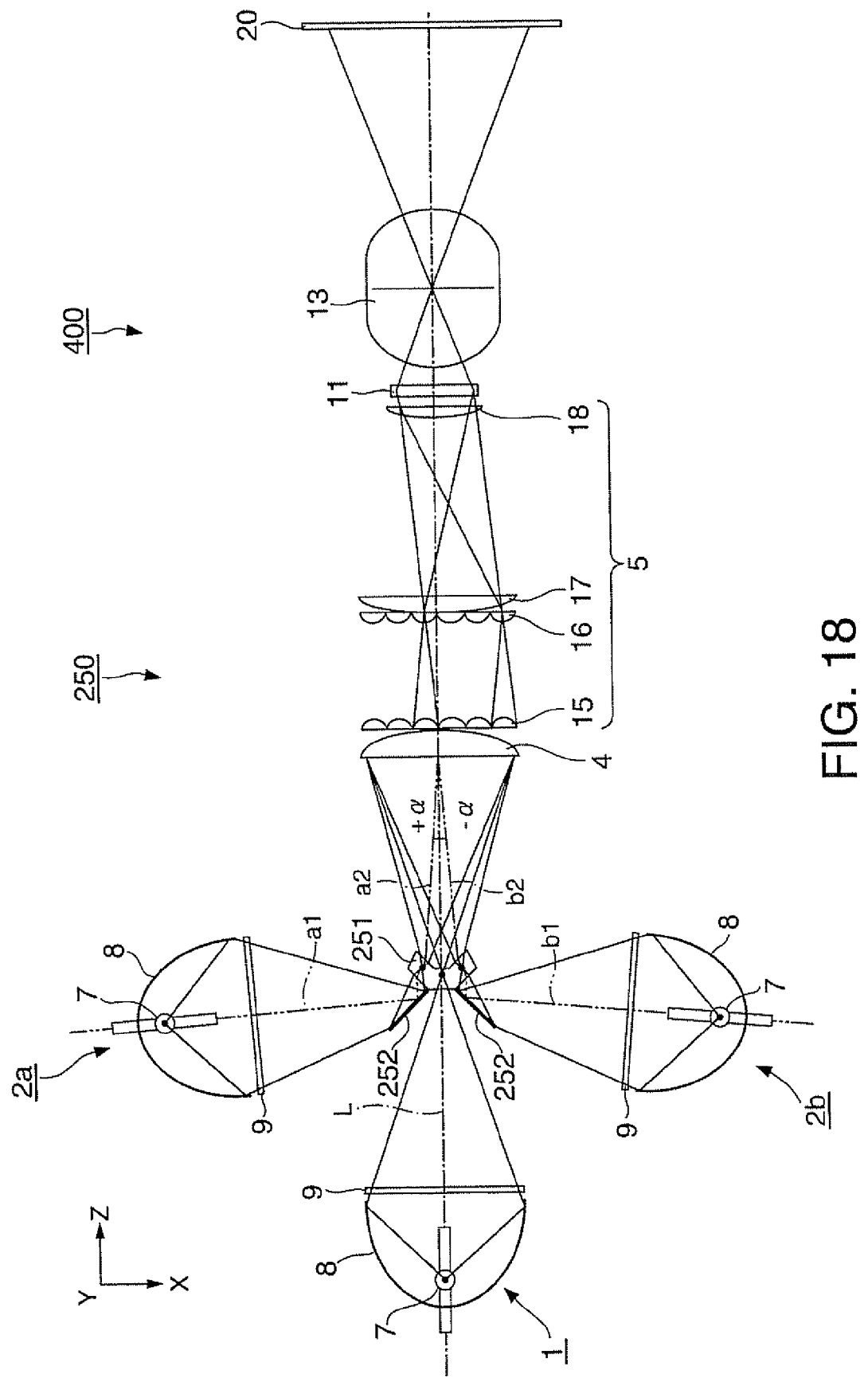
FIG. 18 is a diagram showing a configuration example of a projector equipped with an illumination apparatus according to a fifth embodiment of the invention.
Figure 19A:
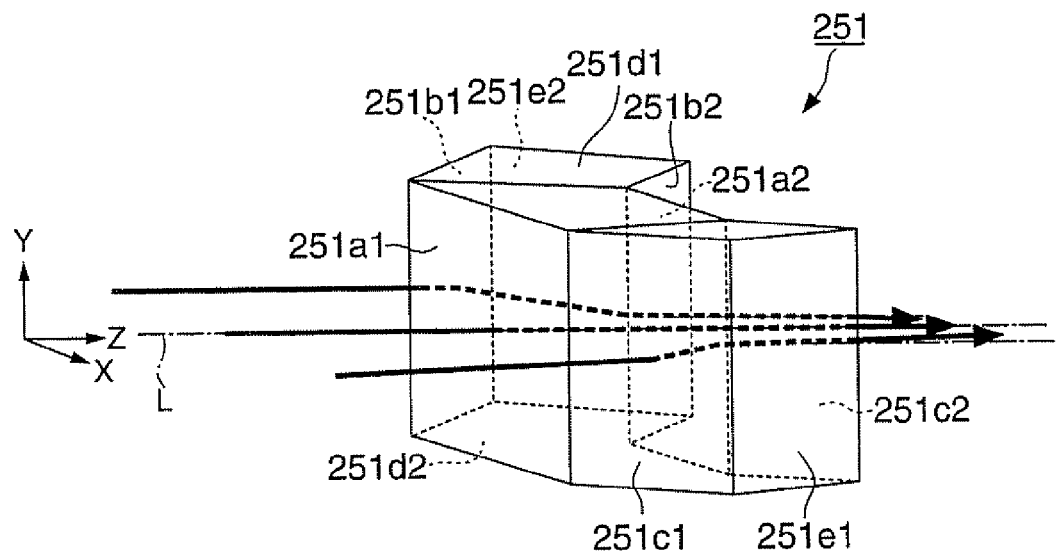
FIGS. 19A and 19B are diagrams showing a configuration example of an optical axis conversion element used in the illumination apparatus of the present embodiment.
Figure 19B:
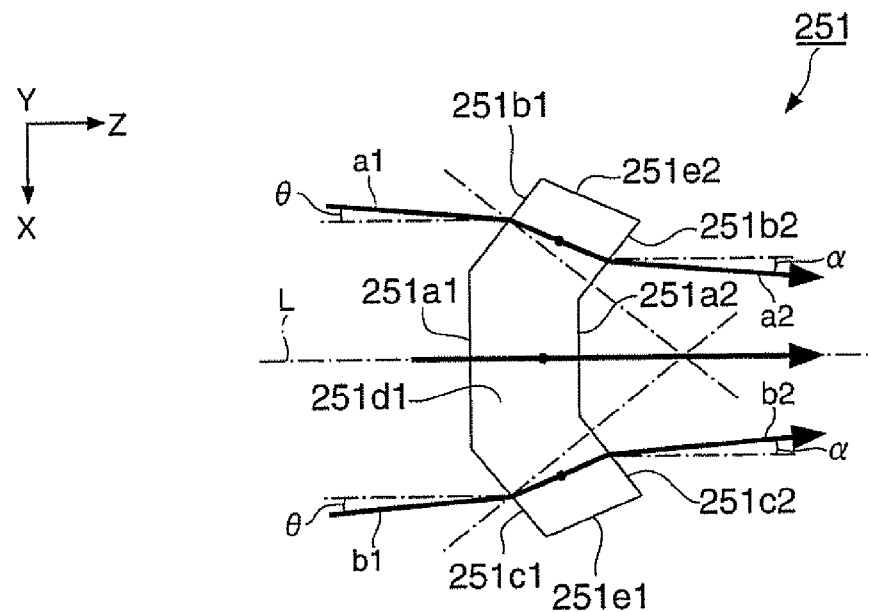

FIG. 18 is a diagram showing a configuration example of a projector 400 equipped with an illumination apparatus 250 according to the embodiment of the invention. FIGS. 19A and 19B are diagrams showing a configuration of the optical axis conversion element 251 used in the present embodiment, wherein FIG. 19A is a perspective view, and FIG. 19B is a plan view.

The overall configuration of the projector shown in FIG. 18 is approximately common to the projector of the first embodiment shown in FIG. 1, and the principal difference is the configuration of the optical axis conversion element of the illumination apparatus. Therefore, in FIG. 18, constituents common to FIG. 1 of the first embodiment are denoted with the same reference symbols, and detailed descriptions therefor will be omitted.

As shown in FIG. 18, the optical axis conversion element 251 is formed of an optical element adapted to refract the incident light beams in the inside thereof, and emit them after converting the positions and the directions of the optical axes thereof. Further, reflecting mirrors 252 (second light source section dedicated optical axis conversion elements) are installed on the light entrance side of the optical axis conversion element 251. The reflecting mirrors 252 are for reflecting the light beams from the second light source sections 2a, 2b to deflect the optical axes thereof, and then inputting them to the optical axis conversion element 251. In the present embodiment, there is adopted a configuration of inputting the light beams from the second light source sections 2a, 2b to the optical axis conversion element 251 via the reflecting mirrors 252, thereby enhancing freedom of installation positions of the second light source sections 2a, 2b. Therefore, in the case in which the first light source section 1 and the two second light source sections 2a, 2b can be disposed without physical interference, for example, use of the reflecting mirrors 252 is not necessarily required.

Hereinafter, the optical axis conversion element 251 will be explained.

As shown in FIGS. 19A and 19B, the optical axis conversion element 251 of the present embodiment is formed of a solid-core transparent member made of a translucent material such as glass, resin, or crystal. The optical axis conversion element 251 has totally ten surfaces among which four surfaces 251d1, 251d2, 251e1, 251e2 are surfaces not contributing to transmission of the light beams. The remaining six surfaces 251a1, 251a2, 251b1, 251b2, 251c1, 251c2 are three pairs of planes (parallel planes) parallel to each other, the number of pairs corresponding to the number of light source sections 1, 2a, 2b. Hereinafter, for the sake of convenience of explanations, a pair of parallel planes composed of the surfaces 251a1, 251a2 is described as a first parallel plane 251a, a pair of parallel planes composed of the surfaces 251b1, 251b2 is described as a second parallel plane 251b, and a pair of parallel planes composed of the surfaces 251c1, 251c2 is described as a second parallel plane 251c.

The two second parallel planes 251b, 251c are respectively formed on both sides of the first parallel plane 251a intersecting perpendicularly with the illumination optical axis L. The two second parallel planes 251b, 251c are disposed having tilts with respect to the illumination optical axis L so that the normal lines of the second parallel planes 251b, 251c intersect the illumination optical axis L on the exit side of the optical axis conversion element 251. The first parallel plane 251a is composed of the incident end surface 251a1 to which the light beam from the first light source section 1 is input, and the exit end surface 251a2 from which the light beam from the first light source section 1 is emitted. The second parallel planes 251b, 251c are composed of the incident end surfaces 251*b*1, 251*c*1 to which the light beams from the second light source sections 2*a*, 2*b* are input, and the exit end surfaces 251*b*2, 251*c*2 from which the light beams from the second light source sections 2*a*, 2*b* are emitted, respectively. Further, it is desirable that these six surfaces 251*a*1, 251*a*2, 251*b*1, 251*b*2, 251*c*1, 251*c*2 are each provided with an antireflection film on the surface thereof.

Here, if light beams enter the second parallel planes 251*b*, 251*c* in the directions tilted from the normal lines of the second parallel planes 251*b*, 251*c*, the light beams are shifted to predetermined directions in parallel to the incident optical axes a1, b1, and then emitted therefrom in the condition of maintaining the incident proceeding directions. The directions of the shifts depend on the directions of the tilts of the second parallel planes 251*b*, 251*c* with respect to the illumination optical axis L, and the amounts of the shifts depend on the incident angles with respect to the normal lines of the second parallel planes 251*b*, 251*c*, the distances in the second parallel planes 251*b*, 251*c* between the two planes forming each of the second parallel planes 251*b*, 251*c*, respectively, and the refractive index of the material forming the optical axis conversion element 251. Therefore, the light beam from the first light source section 1 located on the illumination optical axis L enters along the normal line of the first parallel plane 251*a*, and is then emitted along the illumination optical axis L without changing the proceeding direction. On the other hand, in the case in which the arrangement is made so that the incident optical axes a1, b1 form a predetermined angle α (equivalent to the combining angle) with the illumination optical axis L after the light beam from the second light source sections 2*a*, 2*b* not located on the illumination optical axis L is reflected by the reflecting mirror 252, the light beams from the second light source sections 2*a*, 2*b* not located on the illumination optical axis L are input from the incident end surfaces 251*b*1, 251*c*1 of the second parallel planes 251*b*, 251*c*, the positions of light beams are shifted towards the illumination optical axis L, and then the light beams are emitted from the exit end surfaces 251*b*2, 251*c*2 so as to have the same angle α with the illumination optical axis L as the angle at which they are input thereto.

It should be noted that, in the explanations on and after the present embodiment, the optical axes of the light beams from the second light source sections to be input to the optical axis conversion element are referred to incident optical axes, and denoted with the reference symbols of a1, b1, respectively. Further, the optical axes of the light beams from the second light source sections having been emitted from the optical axis conversion element are referred to exit optical axes, and denoted with the reference symbols of a2, b2, respectively.

In other words, by transmitting the light beams from the second light source sections 2*a*, 2*b* through the second parallel planes 251*b*, 251*c* disposed at predetermined angles with the illumination optical axis L, the positions of the converged spots (as illustrated by a black dots) as the secondary light sources can be made to come closer to the illumination optical axis L. This is equivalent to disposing the second light source sections 2*a*, 2*b*, which are located at positions physically distant from the first light source section 1, optically close to the first light source section 1. Thus, the light beams emitted from the plurality of light source sections 1, 2*a*, 2*b* and having entered the optical axis conversion element 251 are emitted in the condition of being close to each other, and combined into substantially one light beam on the illumination optical axis L.

Also in the projector 400 of the present embodiment, since the spread of the angular distribution of the light emitted from the illumination apparatus 250 is suppressed, there can be obtained the same advantage that a high light use efficiency can be realized.

In the optical axis conversion element 251 of the present embodiment, the incident optical axes a1, b1 of the two second light source sections 2*a*, 2*b* are set to form a predetermined angle α with the illumination optical axis (i.e., the illumination optical axis L) of the first light source section 1 passing through an approximate center of the optical axis conversion element 251. Therefore, the configuration of reflecting the light beams from the two second light source sections 2*a*, 2*b* by the reflecting mirrors 252 to lead them to the optical axis conversion element 251 is adopted, thereby forming the configuration difficult to cause the physical interference between the light source sections 1, 2*a*, 2*b*. It is desirable to use cold mirrors reflecting only necessary light while transmitting unnecessary light such as ultraviolet light or infrared light as the reflecting mirrors 252 used here. Thus, the heat generation in the optical axis conversion element 251 and the subsequent optical elements can be reduced. As the measures for changing the proceeding directions of the light beams from the second light source sections 2*a*, 2*b*, reflecting prisms making use of the total reflection operation can also be used instead of the reflecting mirrors 252.

Further, since the light beams from the light source sections 1, 2*a*, 2*b* are focused to form the images (the converged spots) of the light emitters, and then diverge gradually, it is desirable to use the optical axis conversion element 251 at the stage in which the light beam diameters are still small. Since the light beams entering the optical axis conversion element 251 and the light beams emitted from the optical axis conversion element 251 each have a finite size including the converged spot, it is required to set the aperture sizes of the incident end surfaces 251*a*1, 251*b*1, 251*c*1 and the exit end surfaces 251*a*2, 251*b*2, 251*c*2 so as not to block the light beams. From this viewpoint, it is desirable to use the optical axis conversion element 251 in the arrangement of forming the converged spots by the light source sections 1, 2*a*, 2*b* inside the optical axis conversion element 251. Further, it is desirable to set the arrangement of the light source sections 1, 2*a*, 2*b* and the degree of focusing of the converged light beams from the light source sections 1, 2*a*, 2*b* so that the optical distances from the converged spots formed by the light source sections 1, 2*a*, 2*b* to the combining lens 4 are approximately equal to each other. By adopting such a configuration, the parallelism of the combined light beam can be enhanced while reducing the light beam diameter, thus the light use efficiency in the optical system on and after the combining lens can be improved.

Further, although the two second parallel planes 251*b*, 251*c* are arranged symmetrically around the illumination optical axis L in the optical axis conversion element 251 of the present embodiment, the arrangement is not limited thereto, but the two second parallel planes 251*b*, 251*c* can asymmetrically be arranged. In this case, freedom of the installation positions of the second light source sections 2*a*, 2*b* can be enhanced. Further, although in the present embodiment the reflecting mirrors 252 are also arranged symmetrically, the arrangement is not limited thereto, and the reflecting mirrors 252 can also be arranged asymmetrically corresponding to the arrangement of the second light source sections 2*a*, 2*b*, and it is also possible to dispose the reflecting mirror 252 on either one of the incident optical axes a1, b1 of the two second light source sections 2*a*, 2*b*, for example.

Further, although the optical axis conversion element 251 of the present embodiment adopts the configuration of combining the light beams from the three light source sections, the number of light source sections is not limited to three, but can be equal to or larger than four. On that occasion, it is required to provide the parallel planes (the second parallel planes 251b, 251c in the present embodiment) having the normal lines thereof tilted from the illumination optical axis L at least as many as, or more than the number of second light source sections not located on the illumination optical axis L. It should be noted that since the higher the spatial symmetry of the angular distribution and the intensity distribution of a combined light beam is, the more easily the combined light beam can be used, from this viewpoint, it is desirable that the number of corresponding light source sections is an odd number.

The optical axis conversion element 251 of the present embodiment is composed of three parallel planes 251a, 251b, 251c, and therefore, the shape thereof can be worked with relative ease. Further, in the illumination apparatus 250 using the optical axis conversion element 251, the emission angles of the light beams from the second light source sections 2a, 2b, which are emitted from the optical axis conversion element 251 can be controlled in accordance with the installation angles of the second light source sections 2a, 2b. Therefore, the same optical axis conversion element 251 can be used even in the case of controlling the emission angles, which is suitable for configuring the illumination apparatus 250. Further, since the angles formed by the incident optical axes a1, b1 of the light beams to be input to the reflecting mirror 252 from the second light source sections 2a, 2b and the normal line of the reflecting mirror 252 become larger than 45 degrees, it is suitable for enhancing the reflectance in the reflecting mirrors 252, and the light use efficiency can be improved.

Figure 20:
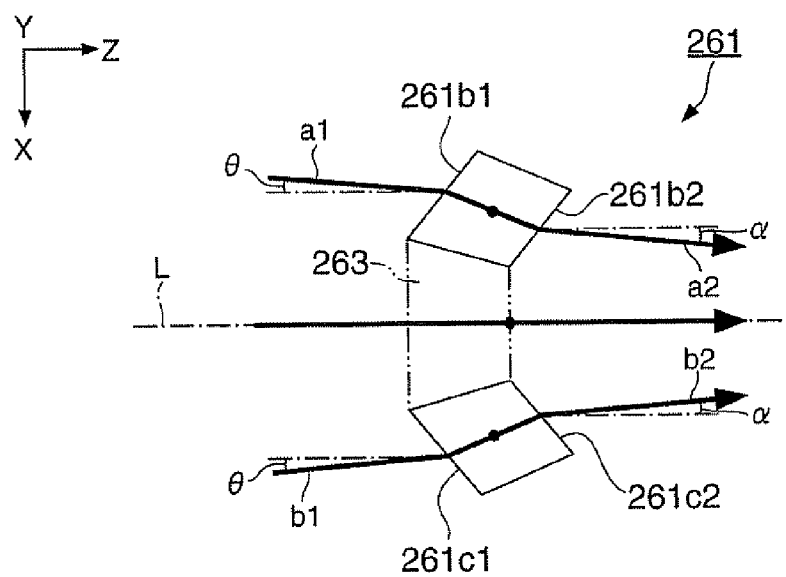
FIG. 20 is a diagram showing another configuration example of the optical axis conversion element.

It should be noted that if the first light source section 1 is disposed on the illumination optical axis L, and the angle deviation of the light beam from the first light source section 1 is not required, it is also possible to use an optical axis conversion element 261 obtained by eliminating the part, which corresponds to the first parallel plane 251a through which the light beam from the first light source section 1 is transmitted, from the optical axis conversion element 251 shown in FIG. 19B, thereby forming a hollow section 263 penetrating therethrough in the extending direction of the illumination optical axis L as shown in FIG. 20 instead of the optical axis conversion element 251 of the present embodiment. The light beams from the second light source sections 2a, 2b are input from the surfaces 261b1, 261c1, the positions of the light beams are shifted towards the illumination optical axis L, and the light beams are then emitted from the surfaces 261b2, 261c2 in directions parallel to the illumination optical axis L.

In the present configuration, it is also possible to adopt the optical axis conversion element obtained by opening only the vicinity of the part of the first parallel plane 251a, through which the light beam from the first light source section 1 is transmitted, to form the hollow section, and integrating the parts on the both sides through which the light beams from the second light source sections 2a, 2b are respectively transmitted, or the optical axis conversion element obtained by eliminating all of the first parallel plane 251a to separate the two parts through which the light beams from the second light source sections 2a, 2b are respectively transmitted. It should be noted that in view of the easiness of handling such as alignment between the light source sections 1, 2a, 2b, it is desirable to use the former.

According to the optical axis conversion element 261 with the present configuration, since the number of physical interfacial surfaces through which the light beam from the first light source section 1 is transmitted is reduced in comparison with the configuration of the optical axis conversion element 251 shown in FIGS. 19A and 19B, the light loss on the interfacial surfaces is reduced, and the light use efficiency in the optical axis conversion element 261 can be improved.

Sixth Embodiment

Hereinafter, a sixth embodiment of the invention will be explained with reference to FIGS. 21, 22A, and 22B.

Figure 21:
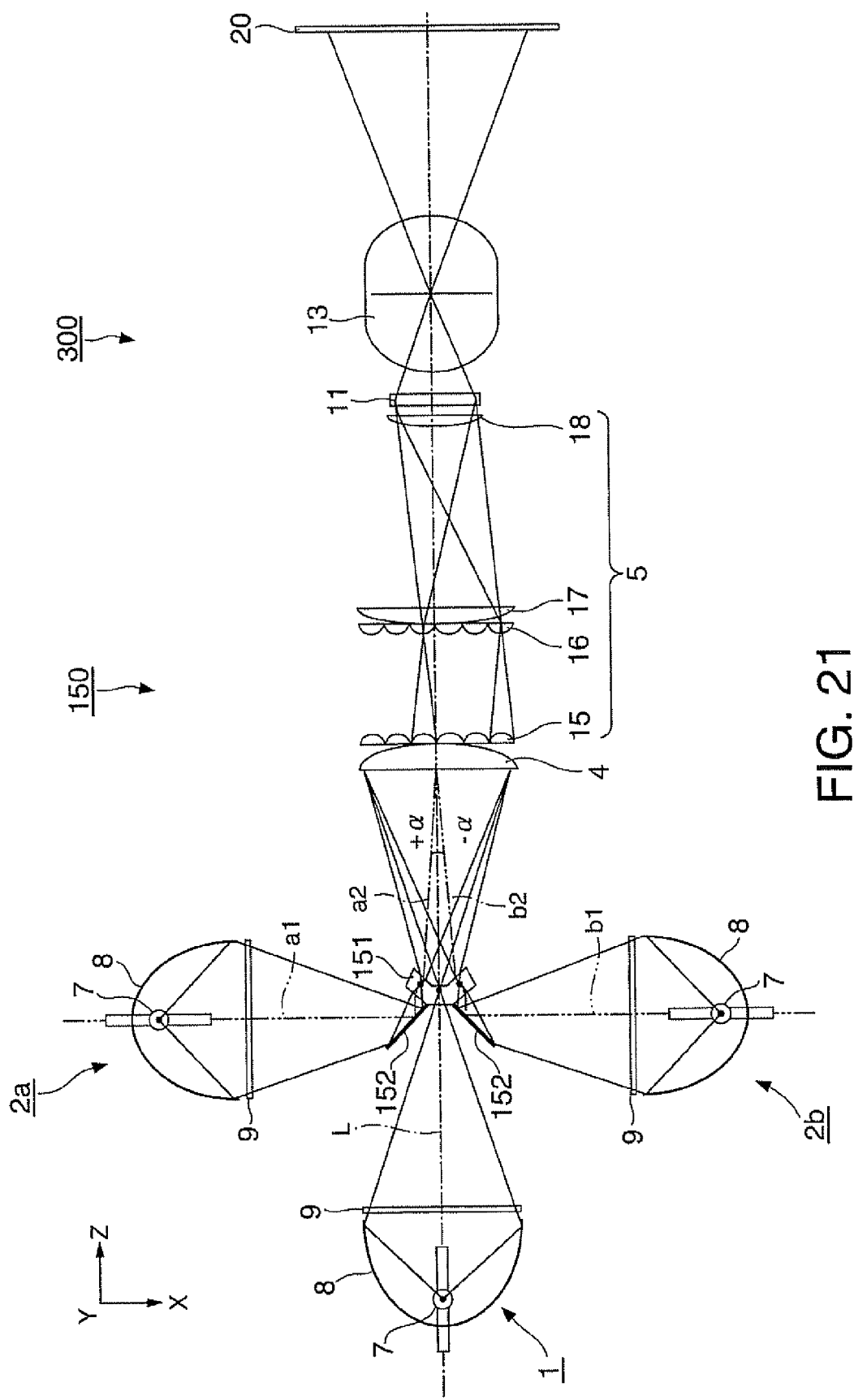
FIG. 21 is a diagram showing a configuration example of a projector equipped with an illumination apparatus according to a sixth embodiment of the invention.

FIG. 21 is a diagram showing a configuration example of a projector 300 equipped with an illumination apparatus 150 according to the embodiment of the invention. FIGS. 22A and 22B are diagrams showing a configuration of the optical axis conversion element 151 used in the present embodiment, wherein FIG. 22A is a perspective view, and FIG. 22B is a plan view.

The overall configuration of the projector shown in FIG. 21 is approximately common to the projector of the fifth embodiment shown in FIG. 18. For example, reflecting mirrors 152 are installed on the light entrance side of the optional axis conversion element 151, similar to the embodiment of FIG. 18. The difference is the configuration of the optical axis conversion element of the illumination apparatus. Therefore, in FIG. 21, constituents common to FIG. 18 of the fifth embodiment are denoted with the same reference symbols, and detailed descriptions therefor will be omitted.

Figure 22A:
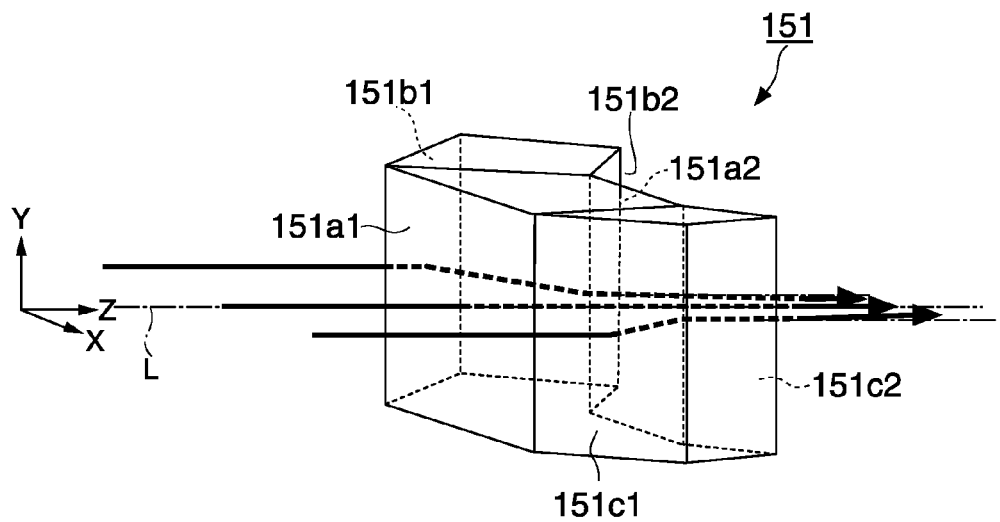
FIGS. 22A and 22B are diagrams showing a configuration example of an optical axis conversion element used in the illumination apparatus of the present embodiment.
Figure 22B:
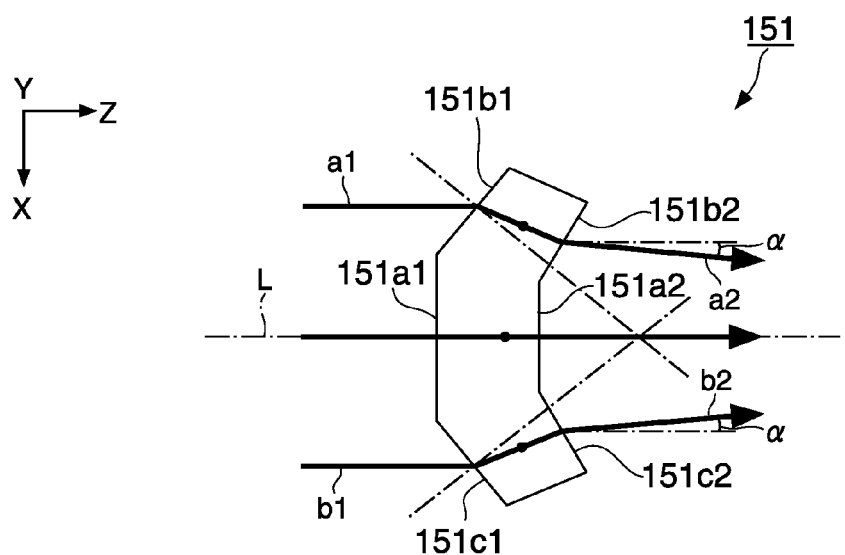

As shown in FIGS. 22A and 22B, the optical axis conversion element 151 of the present embodiment has a part, to which the light beam from the first light source section 1 is input, and which is formed of a pair of parallel planes 151a1 and 151a2, and parts, to which the light beams from the second light source sections 2a, 2b are respectively input, and each of which is formed of a pair of planes (hereinafter referred to as nonparallel plane) nonparallel to each other. Specifically, in the optical axis conversion element 151, the part for transmitting the light beam from the first light source section 1 is formed of a parallel plane 151a composed of the surfaces 151a1, 151a2, and the parts for transmitting the light beams from the second light source sections 2a, 2b are formed of a nonparallel plane 151b composed of an incident end surface 151b1 and an exit end surface 151b2 nonparallel to each other, and a nonparallel plane 151c composed of an incident end surface 151c1 and an exit end surface 151c2 nonparallel to each other. In the case of the present embodiment, imaginary intersection line between the incident end surface 151b1 and the exit end surface 151b2 and imaginary intersection line between the incident end surface 151c1 and the exit end surface 151c2 are each located on the side far from the illumination optical axis L. In other words, the parts for transmitting the light beams from the second light source sections 2a, 2b each have a taper shape tapering off in a direction from the central section (the part for transmitting the light beam from the first light source section 1) of the optical axis conversion element 151 to the end thereof.

In the case of using the optical axis conversion element 151 shown in FIGS. 22A and 22B, the light beam from the first light source section 1 located on the illumination optical axis L is transmitted through the parallel plane 151a without deflecting the optical axis, and emitted along the illumination optical axis L. On the other hand, the light beams from the second light source sections 2a, 2b are refracted on the two interfacial surfaces, namely the incident end surfaces 151b1, 151c1, and the exit end surfaces 151b2, 151c2, respectively, and emitted from the optical axis conversion element 151 at different angles from the angles at which the light beams are input thereto. The light beams transmitted through the nonparallel planes 151b, 151c are emitted with the proceeding directions changed in a direction (towards the illumination optical axis L) away from the imaginary intersection lines between the incident end surfaces 151b1, 151c1 and the exit end surfaces 151b2, 151c2, respectively. Therefore, as shown in FIG. 22B, even in the case in which the incident optical axes a1, b1 are arranged in parallel to the illumination optical axis L, after the light beams from the second light source sections 2a, 2b enter the nonparallel planes 151b, 151c, the positions of the light beams are shifted towards the illumination optical axis L, and at the same time, the light beams are emitted so that the exit optical axes a2, b2 form the predetermined angle α with the illumination optical axis L.

Also in the projector 300 of the present embodiment, since the spread of the angular distribution of the light emitted from the illumination apparatus 150 is suppressed, there can be obtained the same advantage that a high light use efficiency can be realized. Further, since in the case of the present embodiment, in contrast to the configuration of the fifth embodiment, the second light source sections 2a, 2b can be arranged so as to have the incident optical axes a1, b1 parallel to the illumination optical axis L, it is possible to arrange the two second light source sections 2a, 2b in the direction perpendicular to the illumination optical axis L, which is suitable for assuring the arrangement accuracy of the light source sections 1, 2a, 2b.

Hereinafter, modified examples of the optical axis conversion element applicable to the projector of the present embodiment will be explained with reference to FIGS. 23 through 31.

Figure 23:
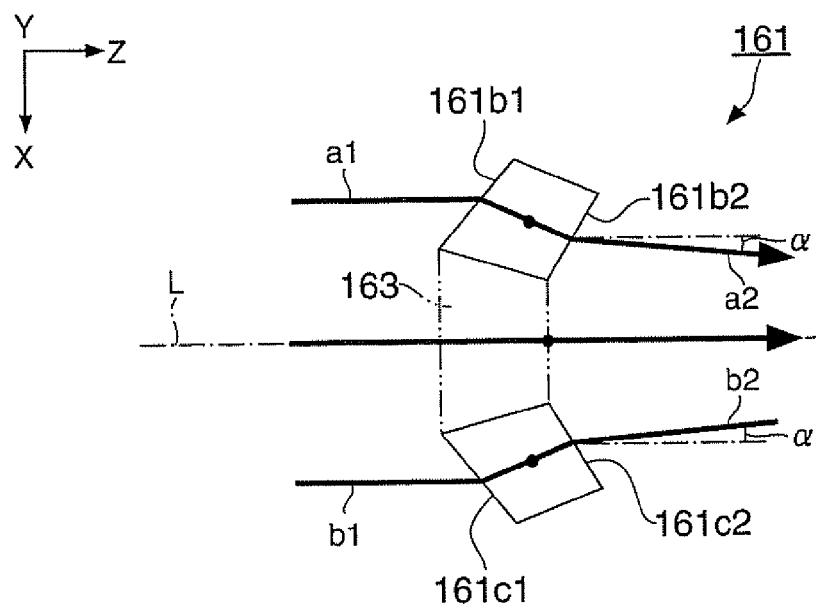
FIG. 23 is a diagram showing another configuration example of the optical axis conversion element.

For example, if the first light source section 1 is disposed on the illumination optical axis L, and the angle deviation of the light beam from the first light source section 1 is not required, it is also possible to use an optical axis conversion element 161 obtained by eliminating the part, which corresponds to the parallel plane 151a through which the light beam from the first light source section 1 is transmitted, from the optical axis conversion element 151 shown in FIG. 22B, thereby forming a hollow section 163 penetrating therethrough in the extending direction of the illumination optical axis L as shown in FIG. 23. The light beams from the second light source sections 2a, 2b are input from the surfaces 161b1, 161c1, the positions of the light beams are shifted towards the illumination optical axis L, the directions of the light beams are changed towards the illumination optical axis L, and the light beams are then emitted from the surfaces 161b2, 161c2 in directions forming the predetermined angle α with the illumination optical axis L. According to the optical axis conversion element 161 with the present configuration, since the number of physical interfacial surfaces through which the light beam from the first light source section 1 is transmitted is reduced in comparison with the configuration of the optical axis conversion element 151 shown in FIG. 22B, the light loss on the interfacial surfaces is reduced, and the light use efficiency in the optical axis conversion element 161 can be improved.

Figure 24:
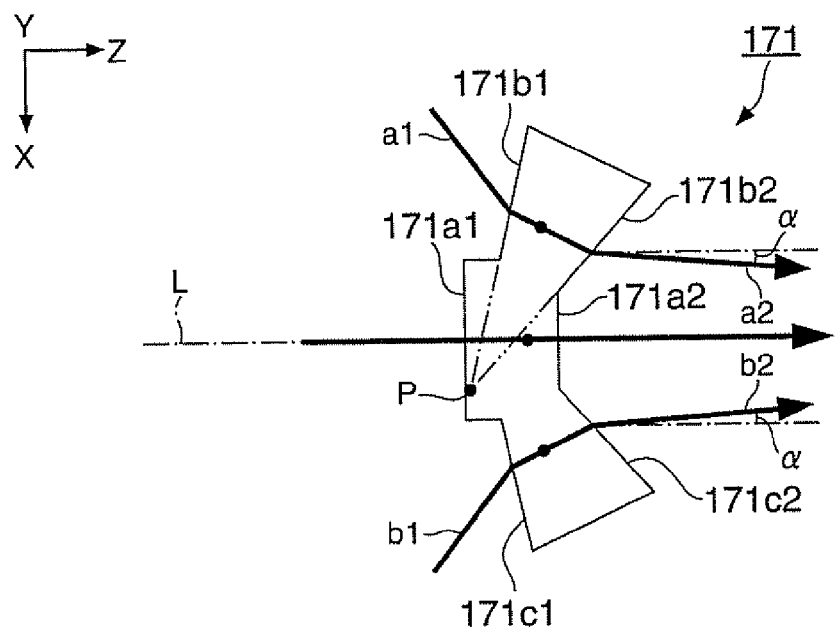
FIG. 24 is a diagram showing another configuration example of the optical axis conversion element.

Further, in the case of forming the parts, to which the light beams from the second light source sections 2a, 2b are input, with the nonparallel planes, in an optical axis conversion element 171 shown in FIG. 24, the part for transmitting the light beam from the first light source section 1 is formed of a parallel plane 171a composed of surfaces 171a1, 171a2, and the parts for transmitting the light beams from the second light source sections 2a, 2b are formed of nonparallel planes 171b, 171c composed of incident end surfaces 171b1, 171c1 and exit end surfaces 171b2, 171c2, disposed nonparallel to each other, respectively, so that the imaginary intersection lines (indicated with e.g., an intersection P in FIG. 24, which represents a point in the intersection line between the incident end surface 171b1 and the exit end surface 171b2 on the X-Z plane) between the incident end surfaces 171b1, 171c1 and the exit end surfaces 171b2, 171c2 are each located on the side near to the illumination optical axis L.

In the case of using the optical axis conversion element 171 shown in FIG. 24, the light beam from the first light source section 1 located on the illumination optical axis L is transmitted through the parallel plane 171a, and emitted along the illumination optical axis L. On the other hand, the light beams from the second light source sections 2a, 2b are refracted on the two interfacial surfaces, namely the incident end surfaces 171b1, 171c1, and the exit end surfaces 171b2, 171c2, respectively, and emitted therefrom so that the exit optical axes a2, b2 form the predetermined angle α with the illumination optical axis L. Thus, it becomes possible to make the positions of the converged spots (as illustrated by a black dots) as the secondary light sources of the second light source sections 2a, 2b come close to the illumination optical axis L. Since in the case with the present configuration, it is possible to significantly deflect the incident optical axes a1, b1 of the second light source sections 2a, 2b, freedom of arrangement of the second light source sections 2a, 2b can be enhanced. Therefore, the reflecting mirrors on the light entrance side of the optical axis conversion element 171 can be eliminated, thus the light use efficiency can be improved.

Figure 25:
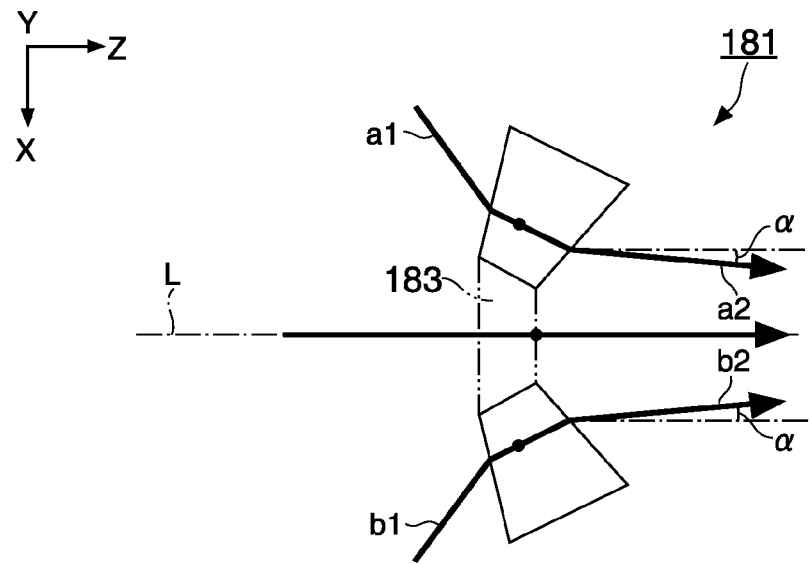
FIG. 25 is a diagram showing another configuration example of the optical axis conversion element.

If the angle deviation of the light beam from the first light source section 1 is not required in the optical axis conversion element 171 shown in FIG. 24, it is also possible to use an optical axis conversion element 181 in which the parallel plane part for transmitting the light beam from the first light source section 1 is eliminated to form a hollow section 183 penetrating therethrough in the extending direction of the illumination optical axis L as shown in FIG. 25. In the case of using the optical axis conversion element 181 with the present configuration, since the number of physical interfacial surfaces through which the light beam from the first light source section 1 is transmitted is reduced in comparison with the configuration of the optical axis conversion element 171 shown in FIG. 24, the light loss on the interfacial surfaces is reduced, and the light use efficiency in the optical axis conversion element can be improved.

Figure 26:
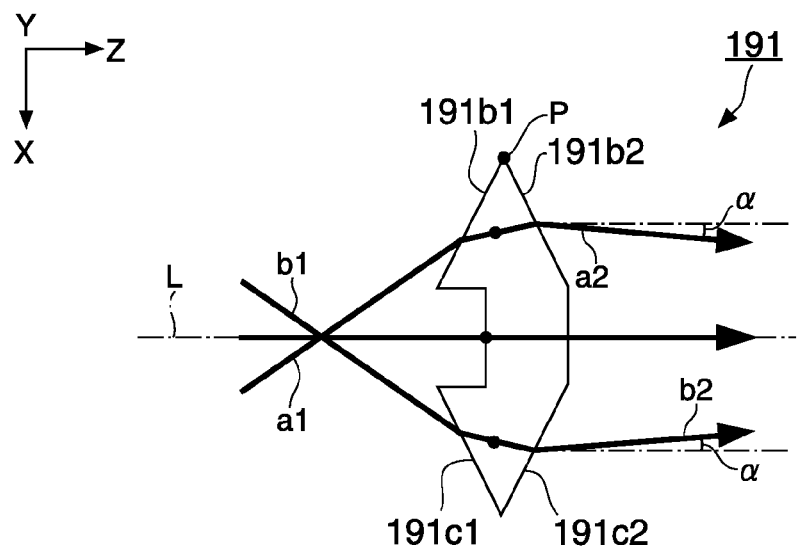
FIG. 26 is a diagram showing another configuration example of the optical axis conversion element.

In the case of forming the parts, to which the light beams from the light source sections 2a, 2b are input, with the nonparallel planes, it is also possible to adopt an optical axis conversion element 191 having a configuration in which the respective imaginary intersection lines (the intersection P in FIG. 26) between incident end surfaces 191b1, 191c1 and exit end surfaces 191b2, 191c2 are each located on the side far from the illumination optical axis L as shown in FIG. 26 instead of the configuration shown in FIG. 24 in which the imaginary intersection lines between the incident end surfaces and the exit end surfaces are each located on the side near to the illumination optical axis L. According to the optical axis conversion element 191 shown in FIG. 26, since the configuration in which the incident optical axes a1, b1 of the two second light source sections 2a, 2b intersect with each other is obtained, an advantage of reducing the illumination apparatus can be obtained.

Figure 27:
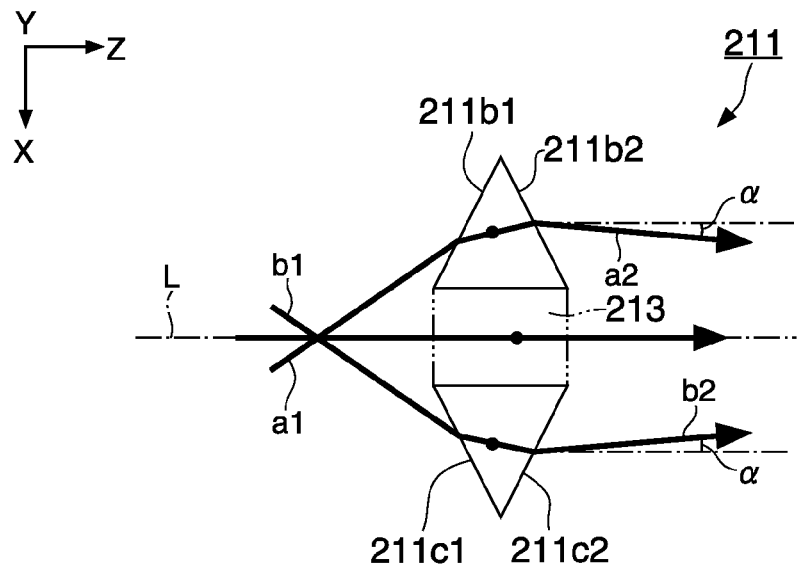
FIG. 27 is a diagram showing another configuration example of the optical axis conversion element.

If the angle deviation of the light beam from the first light source section 1 is not required also in the optical axis conversion element 191 shown in FIG. 26, it is also possible to use an optical axis conversion element 211 in which the parallel plane part for transmitting the light beam from the first light source section 1 is eliminated to form a hollow section 213 penetrating therethrough in the extending direction of the illumination optical axis L as shown in FIG. 27. In the case of using the optical axis conversion element 211 with the present configuration, since the number of physical interfacial surfaces through which the light beam from the first light source section 1 is transmitted is reduced in comparison with the configuration of the optical axis conversion element 191 shown in FIG. 26, the light loss on the interfacial surfaces is reduced, and the light use efficiency in the optical axis conversion element can be improved.

Further, although the optical axis conversion elements described above have the configuration of refracting the light beams on both of the incident end surfaces 211b1 and 211c1 and the exit end surfaces 211b2 and 211c2 of the nonparallel planes to which the light beams from the second light source sections 2a, 2b are input, a configuration of refracting the light beams with either one of the incident end surfaces and the exit end surfaces can also be adopted instead of the configuration described above.

Figure 28:
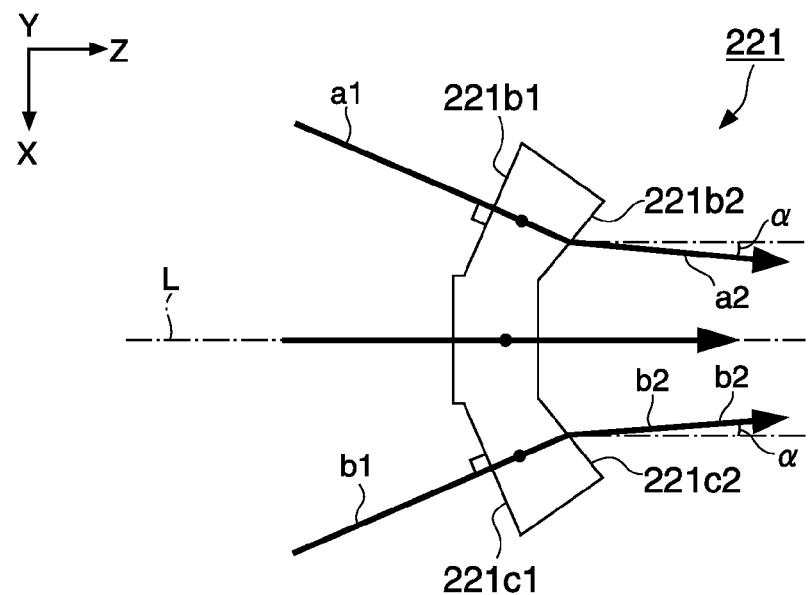
FIG. 28 is a diagram showing another configuration example of the optical axis conversion element.

For example, in the case of an optical axis conversion element 221 shown in FIG. 28, the incident optical axes a1, b1 of the second light source sections 2a, 2b are arranged perpendicular to incident end surfaces 221b1, 221c1. In the present configuration, the light beams are not refracted on the incident end surfaces 221b1, 221c1, but are refracted on exit end surfaces 221b2, 221c2, and then emitted so as to form the predetermined angle α with the illumination optical axis L.

Figure 29:
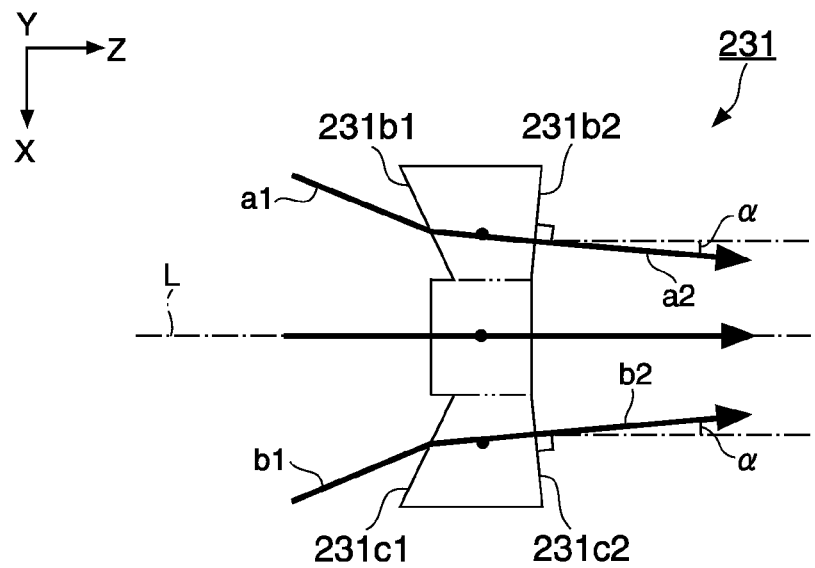
FIG. 29 is a diagram showing another configuration example of the optical axis conversion element.

On the other hand, in the case with an optical axis conversion element 231 shown in FIG. 29, although the incident optical axes a1, b1 of the second light source sections 2a, 2b are not arranged to be perpendicular to incident end surfaces 231b1, 231c1, respectively, exit end surfaces 231b2, 231c2 are arranged to be perpendicular to the optical axes having been refracted by the incident end surfaces 231b1, 231c1. In the present configuration, the light beams are refracted on the incident end surfaces 231b1, 231c1, but not refracted on the exit end surfaces 231b2, 231c2, and then emitted so as to form the predetermined angle α with the illumination optical axis L.

In the case of using the optical axis conversion elements 221, 231 shown in FIGS. 28 and 29, since the light loss on the interfacial surfaces to which the light beams are perpendicularly input can be reduced, the light use efficiency can be improved.

It should be noted that although FIGS. 28 and 29 show the configuration examples of disposing each of the imaginary intersection lines between the incident end surfaces and the exit end surfaces on the side near to the illumination optical axis L as the arrangement of the two planes forming each of the nonparallel planes, also in the case of refracting the light beams on either one of the incident end surfaces and the exit end surfaces as described above, it is possible to adopt the configuration of disposing each of the imaginary intersection lines between the incident end surfaces and the exit end surfaces on the side far from the illumination optical axis L as is the case with the optical axis conversion element 191.

Figure 30:
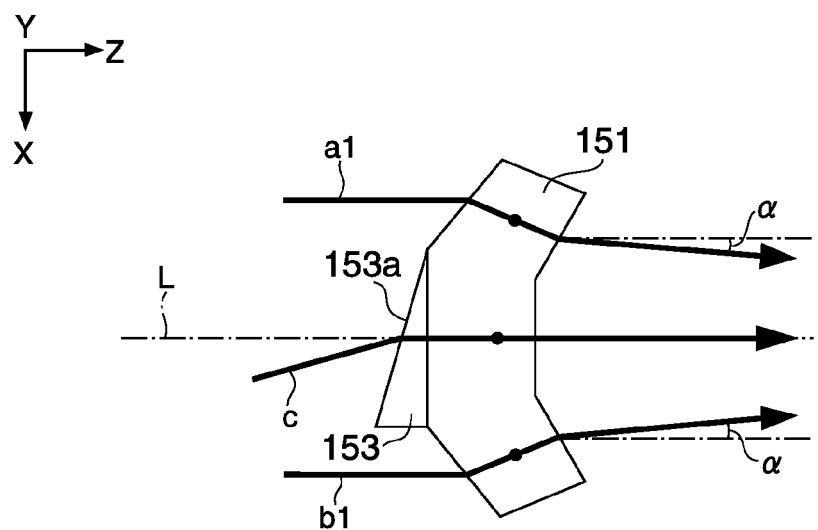
FIG. 30 is a diagram showing another configuration example of the optical axis conversion element.

Also in the case of using the optical axis conversion element using the refraction operation, it is not necessarily required to dispose the first light source section 1 on the illumination optical axis L. For example, as shown in FIG. 30, it is also possible to use what is obtained by disposing a deviation prism 153 (a first light source section dedicated optical axis conversion element) adjacent to the entrance side of the optical axis conversion element 151 shown in FIGS. 22A and 22B. In this case, the illumination optical axis c of the first light source section 1 is arranged to be tilted from the illumination optical axis L so that the illumination optical axis L and the illumination optical axis c of the first light source section 1 intersect with each other at an angle other than 90 degrees. In this case, the tilt of the illumination optical axis c of the first light source section 1 with respect to the illumination optical axis L is set so that the light beam from the first light source section 1 is refracted when entering the incident end surface 153a of the deviation prism 153, and then emitted from the optical axis conversion element 151 along the illumination optical axis L. Thus, the light beam from the first light source section 1 becomes substantially one light beam obtained by combining the light beam from the first light source section 1 with the light beams from the two second light source sections 2a, 2b.

Figure 31:
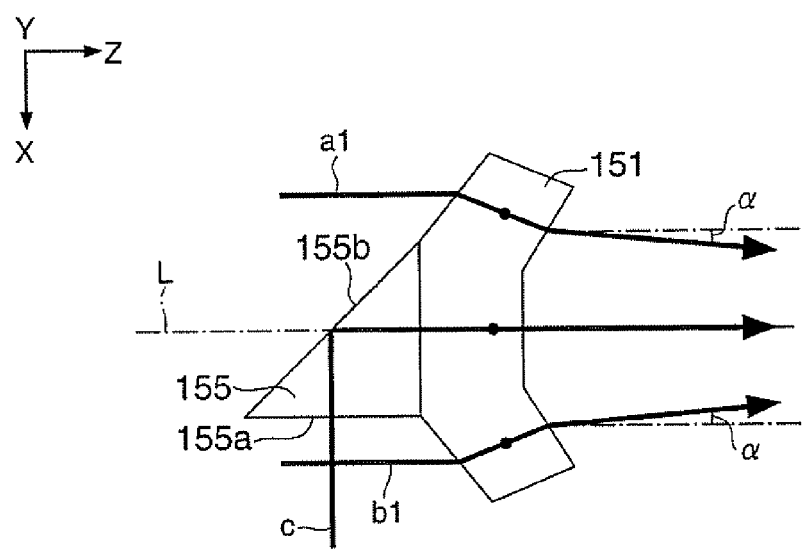
FIG. 31 is a diagram showing another configuration example of the optical axis conversion element.

Alternatively, as shown in FIG. 31, it is also possible to use what is obtained by disposing a reflecting prism 155 (a first light source section dedicated optical axis conversion element) adjacent to the entrance side of the optical axis conversion element 151 shown in FIGS. 22A and 22B. On this occasion, for example, the first light source section 1 is arranged so that the illumination optical axis L and the illumination optical axis c of the first light source section 1 intersect approximately perpendicular to each other. In this configuration, the light beam from the first light source section 1 is transmitted through the incident end surface 155a of the reflecting prism 155, then reflected by a total reflection surface 155b, and then emitted from the optical axis conversion element 151 along the illumination optical axis L. Thus, the light beam from the first light source section 1 becomes substantially one light beam obtained by combining the light beam from the first light source section 1 with the light beams from the two second light source sections 2a, 2b.

According to the configuration shown in FIGS. 30 and 31, since it is not required to dispose the first light source section 1 on the illumination optical axis L, freedom of the arrangement of the first light source section 1 is enhanced, and in some cases, the size of the illumination apparatus in the direction along the illumination optical axis L can be reduced.

It should be noted that it is also possible to dispose a reflecting mirror at the position of the total reflection surface 155b of the reflecting prism 155 in the configuration shown in FIG. 31, instead of installing the reflecting prism 155 on the light entrance side of the optical axis conversion element 151. Also in this case, the same advantages as described above can be obtained.

Incidentally, in the case in which it is attempted to modify the proceeding direction of the light beam within a small angle range, the case of using the reflection operation and the case of using the refraction operation will be compared.

In the case of using the reflection operation, since the angle formed between the optical axis of the incident light beam and the normal line of the reflecting surface is large as shown in FIG. 32A, it is required to increase the size of the reflecting surface necessary for allowing the light beam with a finite beam diameter to enter. In contrast, in the case of using the refraction operation, since the angle formed between the optical axis of the incident light beam and the normal line of the refracting surface is small as shown in FIG. 32B, only a small size is required for the refracting surface necessary for allowing the light beam with a finite beam diameter to enter.

Here, if a configuration obtained by eliminating the reflecting mirrors 252 on the light entrance side of the optical axis conversion element 251 is assumed in the configuration of the projector 400 shown in FIG. 18, since the incident optical axes a1, b1 from the second light source sections 2a, 2b are arranged so as to form small angles with the illumination optical axis L, it proves enough to change the proceeding directions of the light beams within a small angle range in order for making the exit optical axes a2, b2 intersect the illumination optical axis L at small angles with each other. In such a case, the optical axis conversion element using the refraction operation is advantageous, and can contribute to downsizing of the illumination apparatus in some cases.

It should be noted that the scope of the invention is not limited to the embodiments described above, but various modifications can be executed thereon within the scope or the spirit of the invention. For example, although in the illumination apparatus described above the integrator optical system having the two lens arrays is adopted as the equalizing illumination system, it is possible to use an integrator optical system provided with an integrator rod instead thereof. In such a case, it is desirable that the optical axis conversion element emits the light beams, which is input from the second light source sections, so that the exit optical axes thereof intersect the exit optical axis of the light beam from the first light source section at a position on or close to the incident end surface of the integrator rod. It is obvious that the position at which the exit optical axes intersect with each other is not limited to the incident end surface of the integrator rod or the vicinity thereof, but can be set to any position between the incident end surface of the integrator rod and the light valve. Further, it is also possible to adopt a configuration of disposing the integrator rod immediately after the optical axis conversion element instead of using the combining lens. Alternatively, it is also possible to adopt a configuration of using a combining lens having a converging characteristic instead of the collimating characteristic, and disposing the integrator rod at the position on which the light beams are focused.

Besides the above, modifications can appropriately be provided to specific configurations such as shapes, numbers, or arrangements of the constituents of the projector.

The entire disclosure of Japanese Patent Application Nos. 2008-12220305, filed May 2, 2008 and 2009-16759, filed Jan. 28, 2009 are expressly incorporated by reference herein.

What is claimed is:

1. A projector comprising:
an illumination optical system;
a light modulation element adapted to modulate a light beam from the illumination optical system; and
a projection optical system adapted to project the light beam modulated by the light modulation element,
wherein the illumination optical system includes a first light source section,
a plurality of second light source sections including one second light source section and another second light source section, and
an optical axis conversion element adapted to emit light beams, which are input from the first light source section and the plurality of second light source sections, in predetermined directions, respectively,
the optical axis conversion element emits the light beam, which is input from the first light source section, so that an exit optical axis of the light beam approximately matches with an illumination optical axis, and emits the light beams, which are respectively input from the plurality of second light source sections, so that exit optical axes of the light beams intersect the exit optical axis of the light beam from the first light source section between the optical axis conversion element and the light modulation element,
the exit optical axis of the light beam of the first light source section is disposed between an exit optical axis of the light beam of the one second light source section and an exit optical axis of the another second light source section,
the optical axis conversion element having a first transmissive end plane disposed at a first end of the optical axis conversion element,
a second transmissive end plane disposed at a second end of the optical axis conversion element opposite the first end, the first and second transmissive end planes being perpendicular to the illumination optical axis, and the first end having a smaller area than the second end, and
an integrator optical system disposed between the optical axis conversion element and the light modulation element.

2. The projector according to claim 1, wherein
the optical axis conversion element emits the light beams, which are input from the plurality of second light source sections, so that the exit optical axes of all of the light beams from the plurality of second light source sections intersect the exit optical axis of the light beam from the first light source section at a point between the optical axis conversion element and the light modulation element.

3. The projector according to claim 1, wherein
the integrator optical system includes at least a lens array adapted to divide the light beams, which are input from the first light source section and the plurality of second light source sections, into a plurality of light beams, and
the optical axis conversion element emits the light beams, which are input from the plurality of second light source sections, so that the exit optical axes of all of the light beams from the plurality of second light source sections intersect the exit optical axis of the light beam from the first light source section at a position of or close to the lens array.

4. The projector according to claim 1 wherein
the integrator optical system includes at least an integrator rod, and
the optical axis conversion element emits the light beams, which are input from the plurality of second light source sections, so that the exit optical axes of all of the light beams from the plurality of second light source sections intersect the exit optical axis of the light beam from the first light source section at a position of or close to an incident end of the integrator rod.

5. The projector according to claim 1, wherein
the first light source section is disposed on an illumination optical axis, and the plurality of second light source sections is disposed at positions shifted from the illumination optical axis.

6. The projector according to claim 5, wherein
the light beam from the first light source section is focused on a position of or close to an exit end of the optical axis conversion element.

7. The projector according to claim 5, wherein
the optical axis conversion element reflects the light beams, which are emitted respectively from the plurality of second light source sections, to emit the light beams.

8. The projector according to claim 7, wherein
on or close to each of constituent reflecting surfaces of the plurality of reflecting surfaces, the light beam from the second light source section corresponding to the reflecting surface is focused.

9. The projector according to claim 7, wherein
the reflecting surfaces of the optical axis conversion element are surface-reflecting surfaces adapted to surface-reflect the light beams, which are emitted respectively from the plurality of second light source sections.

10. The projector according to claim 9, wherein
the reflecting surface is provided with a dielectric multilayer film.

11. The projector according to claim 7, wherein
the reflecting surfaces of the optical axis conversion element are total-reflecting surfaces adapted to totally reflect the light beams, which are emitted respectively from the plurality of second light source sections.

12. The projector according to claim 5, wherein
the optical axis conversion element refracts the light beams, which are emitted respectively from the plurality of second light source sections, to emit the light beams.

13. The projector according to claim 5, wherein the one second light source section and the another second light source section are disposed on opposite sides of the illumination optical axis.

14. The projector according to claim 1, wherein
a first light source section dedicated optical axis conversion element adapted to deflect an optical axis of the light beam, which is emitted from the first light source section, is provided on an entrance side of the optical axis conversion element.

15. The projector according to claim 1, wherein
a second light source section dedicated optical axis conversion element adapted to deflect an optical axis of the light beam, which is emitted from at least one of the plurality of second light source sections, is provided on an entrance side of the optical axis conversion element.

16. The projector according to claim 1, wherein
the optical axis conversion element is provided with a radiation member.

17. The projector according to claim 1, wherein
the optical axis conversion element is housed in a housing having a light transmitting property.

18. The projector according to claim 1, wherein
the optical axis conversion element has at least two reflecting surfaces tilted at predetermined angles with the illumination optical axis, and each of the light beams, which are emitted from the plurality of second light source sections, is reflected by either one of the plurality of reflecting surfaces,
the at least two reflecting surfaces being formed on opposite sides of the optical axis conversion element and at the same predetermined angle with respect to the illumination optical axis such that the exit optical axes of the light beams reflected by the at least two reflecting surfaces form angles of $+\alpha$ and $-\alpha$ with the illumination optical axis.

19. An illumination apparatus for illuminating an illumination object, comprising:
a first light source section;
a plurality of second light source sections including one second light source section and another second light source section, and
an optical axis conversion element adapted to emit light beams, which are input from the first light source section and the plurality of second light source sections, in predetermined directions, respectively,
wherein the optical axis conversion element emits the light beam, which is input from the first light source section, so that an exit optical axis of the light beam approximately matches with an illumination optical axis, and emits the light beams, which are respectively input from the plurality of second light source sections, so that exit optical axes of the light beams intersect the exit optical axis of the light beam from the first light source section on an exit side and outside of the optical axis conversion element,
the exit optical axis of the light beam of the first light source section is disposed between an exit optical axis of the light beam of the one second light source section and an exit optical axis of the another second light source section,
the optical axis conversion element having a first transmissive end plane disposed at a first end of the optical axis conversion element,
a second transmissive end plane disposed at a second end of the optical axis conversion element opposite the first end, the first and second transmissive end planes being perpendicular to the illumination optical axis, and the first end having a smaller area than the second end, and
an integrator optical system disposed between the optical axis conversion element and the illumination object.

20. An illumination method comprising:
emitting a light beam, which is emitted from a first light source section, towards an illumination object by using an optical axis conversion element so that an exit optical axis of the light beam approximately matches with an illumination optical axis; and
emitting light beams, which are emitted from a plurality of second light source sections including one second light source section and another second light source section, towards the illumination object so that exit optical axes of the light beams intersect the exit optical axis of the light beam from the first light source section on an exit side and outside of the optical axis conversion element,
the exit optical axis of the light beam of the first light source section being disposed between an exit optical axis of the light beam of the one second light source section and an exit optical axis of the another second light source section,
the optical axis conversion element having a first transmissive end plane disposed at a first end of the optical axis conversion element,
a second transmissive end plane being disposed at a second end of the optical axis conversion element opposite the first end, the first and second transmissive end planes being perpendicular to the illumination optical axis, and the first end having a smaller area than the second end, and
an integrator optical system being disposed between the optical axis conversion element and the illumination object.

* * * * *